(12) United States Patent
Harviainen et al.

(10) Patent No.: US 11,961,264 B2
(45) Date of Patent: Apr. 16, 2024

(54) SYSTEM AND METHOD FOR PROCEDURALLY COLORIZING SPATIAL DATA

(71) Applicant: InterDigital VC Holdings, Inc., Wilmington, DE (US)

(72) Inventors: Tatu V. J. Harviainen, Helsinki (FI); Louis Kerofsky, San Diego, CA (US); Ralph Neff, San Diego, CA (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 394 days.

(21) Appl. No.: 17/298,379

(22) PCT Filed: Dec. 11, 2019

(86) PCT No.: PCT/US2019/065771
§ 371 (c)(1),
(2) Date: May 28, 2021

(87) PCT Pub. No.: WO2020/123686
PCT Pub. Date: Jun. 18, 2020

(65) Prior Publication Data
US 2022/0005232 A1 Jan. 6, 2022

Related U.S. Application Data

(60) Provisional application No. 62/779,758, filed on Dec. 14, 2018.

(51) Int. Cl.
*G06T 9/00* (2006.01)
*G06T 17/00* (2006.01)

(52) U.S. Cl.
CPC .............. *G06T 9/001* (2013.01); *G06T 9/002* (2013.01); *G06T 17/00* (2013.01)

(58) Field of Classification Search
None
See application file for complete search history.

(56) References Cited

U.S. PATENT DOCUMENTS 6,201,546 B1   3/2001  Border
7,982,927 B2 *  7/2011  Sasaki .................. H04N 1/6058
                                            358/1.9

(Continued)

FOREIGN PATENT DOCUMENTS

CN   107194983   9/2017
CN   107862293   3/2018

(Continued)

OTHER PUBLICATIONS

Kuma, Satoru, et. al., "PCC CE1.3 Recolor Method". Sony Corporation, International Organization For Standardization, Coding Of Moving Pictures And Audio, ISO/IEC JTC1/SC29/WG11 MPEG2017/M42141, Jan. 2018, 9 pages.

(Continued)

*Primary Examiner* — Anand P Bhatnagar
(74) *Attorney, Agent, or Firm* — Klintworth & Rozenblat IP LLP

(57) ABSTRACT

Systems and methods are described for compressing color information in point cloud data. In some embodiments, point cloud data includes point position information and point color information for each of a plurality of points. The point position information is provided to a neural network, and the neural network generates predicted color information (e.g. predicted luma and chroma values) for respective points in the point cloud. A prediction residual is generated to represent the difference between the predicted color information and the input point color position. The point position information (which may be in compressed form) and the prediction residual are encoded in a bitstream. In some embodi- (Continued)

ments, color hint data is encoded to improve color prediction.

20 Claims, 10 Drawing Sheets

(56) References Cited

U.S. PATENT DOCUMENTS

| | | | |
|---|---|---|---|
| 8,280,161 B2* | 10/2012 | Dalal | H04N 1/6033 358/1.9 |
| 8,471,849 B1 | 6/2013 | Hickman | |
| 8,525,848 B2 | 9/2013 | Janson | |
| 8,768,659 B2 | 7/2014 | Vasudevan | |
| 8,848,201 B1 | 9/2014 | Bruce | |
| 9,412,361 B1 | 8/2016 | Geramifard | |
| 10,699,421 B1 | 6/2020 | Cherevatsky | |
| 10,750,178 B2 | 8/2020 | Rossato | |
| 11,328,474 B2 | 5/2022 | Harviainen | |
| 2007/0014478 A1 | 1/2007 | Birinov | |
| 2007/0036467 A1* | 2/2007 | Coleman | G06T 3/4061 382/294 |
| 2007/0047840 A1 | 3/2007 | Xu | |
| 2008/0309995 A1* | 12/2008 | Sasaki | H04N 1/6058 358/518 |
| 2009/0128554 A1 | 5/2009 | Elsberg | |
| 2010/0189348 A1* | 7/2010 | Dalal | H04N 1/6033 382/167 |
| 2011/0115812 A1 | 5/2011 | Minear | |
| 2012/0194517 A1 | 8/2012 | Izadi | |
| 2014/0198097 A1 | 7/2014 | Evans | |
| 2015/0006117 A1 | 1/2015 | Zhang | |
| 2015/0035820 A1 | 2/2015 | Le | |
| 2015/0254499 A1 | 9/2015 | Pang | |
| 2016/0044240 A1 | 2/2016 | Beers | |
| 2016/0071318 A1 | 3/2016 | Lee | |
| 2016/0133044 A1 | 5/2016 | Lynch | |
| 2016/0333691 A1 | 11/2016 | Puura | |
| 2016/0371539 A1 | 12/2016 | Ming | |
| 2017/0083792 A1 | 3/2017 | Rodríguez-Serrano | |
| 2017/0213394 A1 | 7/2017 | Ratcliff | |
| 2017/0214943 A1* | 7/2017 | Cohen | H04N 19/62 |
| 2017/0243352 A1 | 8/2017 | Kutliroff | |
| 2017/0264833 A1 | 9/2017 | Barnes | |
| 2017/0287216 A1 | 10/2017 | Kim | |
| 2017/0323472 A1 | 11/2017 | Barnes | |
| 2017/0347122 A1 | 11/2017 | Chou | |
| 2018/0053324 A1 | 2/2018 | Cohen | |
| 2018/0170388 A1 | 6/2018 | Shin | |
| 2018/0249158 A1 | 8/2018 | Huang | |
| 2018/0268570 A1 | 9/2018 | Budagavi | |
| 2018/0341836 A1 | 11/2018 | Lim | |
| 2019/0043242 A1* | 2/2019 | Risser | G06T 15/04 |
| 2019/0058859 A1 | 2/2019 | Price | |
| 2019/0087978 A1* | 3/2019 | Tourapis | G06T 9/001 |
| 2019/0096035 A1 | 3/2019 | Li | |
| 2019/0227145 A1 | 7/2019 | Pishehvari | |
| 2019/0289281 A1 | 9/2019 | Badrinarayanan | |
| 2019/0295266 A1 | 9/2019 | Fan | |
| 2020/0184602 A1 | 6/2020 | Li | |
| 2020/0311881 A1 | 10/2020 | Lanman | |
| 2021/0142522 A1 | 5/2021 | Li | |
| 2021/0235085 A1* | 7/2021 | Chen | H04N 19/30 |
| 2021/0337955 A1* | 11/2021 | Bonnin | G16H 20/70 |
| 2022/0191497 A1 | 6/2022 | Rossato | |
| 2023/0074296 A1 | 3/2023 | Wang | |
| 2023/0080852 A1 | 3/2023 | Meardi | |

FOREIGN PATENT DOCUMENTS

| | | |
|---|---|---|
| CN | 107925762 A | 4/2018 |
| CN | 108038906 A | 5/2018 |
| CN | 108090960 A | 5/2018 |
| CN | 108320330 A | 7/2018 |
| CN | 108833927 A | 11/2018 |
| DE | 102017011562 | 5/2018 |
| EP | 3296962 | 3/2018 |
| GB | 2576548 A | 2/2020 |
| JP | 2015522987 A | 8/2015 |

OTHER PUBLICATIONS

Nakagami, Ohji, et. al., "Point cloud compression technology proposal by Sony". International Organization For Standardization, Coding Of Moving Pictures And Audio, ISO/IEC JTC1/SC29/WG11 MPEG2017/ M41665, Oct. 2017, 43 pages.

Qi, Charles R., et. al., "Pointnet++: Deep Hierarchical Feature Learning On Point Sets In A Metric Space". arXiv preprint arXiv:1706.02413, (2017), pp. 1-14.

Klokov, Roman, et. al., "Escape From Cells: Deep Kd-Networks For The Recognition Of 3d Point Cloud Models". Proceedings of the IEEE International Conference on Computer Vision, (2017), pp. 863-872.

Ben-Shabat, Yizhak, et. al., "3D Point Cloud Classification And Segmentation Using 3d Modified Fisher Vector Representation For Convolutional Neural Networks". arXiv preprint arXiv:1711.0824, Nov. 22, 2017, pp. 1-13.

Santana Núñez, Jose Miguel, et. al., "Visualization of Large Point Cloud in Unity". Eurographics Technical Report Series, (2019), pp. 23-24.

Nakagami, Ohji, et. al., "Point cloud compression technology proposal by Sony". International Organization For Standardization, Coding Of Moving Pictures And Audio, ISO/IEC JTC1/SC29/WG11 MPEG2017, M41665 Power Point Presentation, Oct. 2017, 43 pages.

Qi, Charles R., et. al., "PointNet: Deep Learning on Point Sets For 3D Classification and Segmentation". Supplementary Material, arXiv:1612.00593v2, Apr. 10, 2017, 19 pages.

Xu, Cao, et. al., "Point Cloud Colorization Based on Densely Annotated 3D Shape Dataset". Arix.org, Oct. 12, 2018.

Xiao, Yi, et. al., "Interactive Deep Colorization with Simultaneous Global and Local Inputs". Arix.org, Jan. 27, 2018.

Mammou, Khaled, et. al., "PCC Test Model Category 13 v3". International Organization for Standardization, MPEG Meeting; Motion Picture Expert Group or ISO/IEC JTC1/SC29/WG11, No. n17762, Jul. 2018, 18 pages.

International Search Report and Written Opinion of the International Searching Authority for PCT/US2019/065771 dated Mar. 27, 2020, 12 pages.

Collet, Alvaro, et. al. "High-Quality Streamable Free-Viewpoint Video". ACM Transactions on Graphics (TOG), vol. 34, No. 4, (2015), 13 pages.

Orts-Escolano, Sergio, et. al., "Holoportation: Virtual 3D Teleportation In Real-Time". ACM Proceedings of the 29th Annual Symposium on User Interface Software and Technology, (2016), pp. 741-754.

Thanou, Dorina, et. al. "Graph-Based Motion Estimation And Compensation For Dynamic 3D Point Cloud Compression". IEEE International Conference on Image Processing (ICIP), (2015), 5 pages.

De Queiroz, Ricardo L., et. al. "Compression Of 3D Point Clouds Using A Region-Adaptive Hierarchical Transform". IEEE Transactions on Image Processing, Aug. 2016, vol. 25, No. 8, pp. 3947-3956.

Huang, Jing, et. al., "Point Cloud Matching Based On 3D Self-Similarity". IEEE Computer Society Conference on Computer Vision and Pattern Recognition Workshops (CVPRW), (2012), pp. 1-8.

Bouaziz, Sofien, et. al., "Sparse Iterative Closest Point". Eurographics Symposium on Geometry Processing, vol. 32, No. 5, (2013), 11 pages.

Cited as: "Point Cloud Library". Pointclouds.com, Web Archive dated Dec. 10, 2018, available at: https://web.archive.org/web/20181206231901/http://www.pointclouds.org/documentation/tutorials/cluster_extraction.php#cluster-extraction, 6 pages.

(56) References Cited

OTHER PUBLICATIONS

Wikipedia, "Transformation Matrix". Wikipedia web article, available at: https://en.wikipedia.org/w/index.php?title=Transformation_matrix&oldid=788651536, version dated Jul. 2, 2017, 9 pages.

Wang, Zunran, et. al., "Preprocessing And Transmission For 3D Point Cloud Data". International Conference on Intelligent Robotics and Applications, (2017), pp. 438-449.

Sultani, Zainab Namh, et. al., "Kinect 3D Point Cloud Live Video Streaming". International Conference on Communication, Management and Information Technology (ICCMIT), Procedia Computer Science, vol. 65, (2015), pp. 125-132.

International Search Report and Written Opinion of the International Searching Authority for PCT/US2019/022994 dated Jun. 27, 2019, 13 pages.

Ramanathan, Subramanian, et. al., "Impact of Vertex Clustering on Registration-Based 3D Dynamic Mesh Coding". Image and Vision Computing, vol. 26, No. 7, Jul. 2, 2008, pp. 1012-1026.

Gupta, Sumit, et. al., "Compression of Dynamic 3D Geometry Data Using Iterative Closet Point Algorithm". Computer Vision and Image Understanding, vol. 87, No. 1-3, Jul. 1, 2002, pp. 116-130.

De Floriani, L., et. al., "Dynamic View-Dependent Multiresolution on A Client-Server Architecture". Computer Aided Design, vol. 32, No. 13, Nov. 1, 2000, pp. 805-823.

Hajizadeh, Mohammadali, et. al., "Eigenspace Compression: Dynamic 3D Mesh Compression by Restoring Fine Geometry to Deformed Coarse Models". Multimedia Tools and Applications, vol. 77, No. 15, Nov. 14, 2017, pp. 19347-19375.

International Preliminary Report on Patentability PCT/US2019/022994 dated Sep. 22, 2020, 10 pages.

Saransaari, Hannu, "Visualization Of Large Point Clouds". Umbra 3D Blog Article dated Apr. 7, 2016, available at: https://web.archive.org/web/20170928180350/http://umbra3d.com/visualization-of-large-point-clouds, 4 pages.

Liang, Shu, et. al., "3D Face Hallucination From A Single Depth Frame". IEEE 2nd International Conference On 3D Vision (3DV), Dec. 2014, 22 pages.

Gomes, Rafael Beserra, et. al., "Efficient 3D Object Recognition Using Foveated Point Clouds". Computers and Graphics, vol. 37, (2013), pp. 496-508.

Huang, Jing, et. al., "Point Cloud Labeling Using 3D Convolutional Neural Network". IEEE 23rd International Conference on Pattern Recognition (ICPR), (2016), pp. 2670-2675.

International Search Report and Written Opinion of the International Searching Authority for PCT/US2019/021846 dated Jun. 6, 2019, 11 pages.

Meng, Fang, et. al. "Streaming Transmission of Point-Sampled Geometry Based on View-Dependent Level-Of-Detail". Fourth International Conference on 3-D Digital Imaging and Modeling, Oct. 6-10, 2003, 8 pages.

Lequan, Yu, et. al., "PU-Net: Point Cloud Upsampling Network". Proceedings of the IEEE Conference on Computer Vision and Pattern Recognition, (2018), pp. 2790-2799.

Seo, Jinseok, et. al., "Levels of Detail (LOD) Engineering of VR Objects". Proceedings of The ACM Symposium on Virtual Reality Software and Technology, Dec. 20-22, 1999, pp. 104-110.

International Preliminary Report on Patentability PCT/US2019/021846 dated Sep. 22, 2020, 8 pages.

Wang, Zongji, et. al., "VoxSegNet: Volumetric CNNs for Semantic Part Segmentation of 3D Shapes". Journal of Latex Class Files, vol. 14, No. 8, Aug. 2015, pp. 1-11.

Lunscher, Nolan, et. al., "Point Cloud Completion Of Foot Shape From A Single Depth Map For Fit Matching Using Deep Learning View Synthesis". Proceedings of the IEEE International Conference on Computer Vision Workshops, (2017), pp. 2300-2305.

Han, Xiaoguang, et. al. "High-Resolution Shape Completion Using Deep Neural Networks For Global Structure And Local Geometry Inference". Proceedings of the IEEE International Conference On Computer Vision, (2017), pp. 85-93.

Qi, Charles R., et. al., "PointNet: Deep Learning on Point Sets For 3D Classification and Segmentation". Presentation, Stanford University, (2017), 68 pages.

Zhang, Richard, et. al., "Colorful Image Colorization". European Conference on Computer Vision, (2016), pp. 1-29.

Zhang, Richard, et al., "Real-Time User-Guided Image Colorization With Learned Deep Priors". ACM Transactions on Graphics, vol. 36, No. 4, Article 119, Jul. 2017, pp. 1-11.

Mekuria, Rufael, et. al., "Overview Of The MPEG Activity On Point Cloud Compression". IEEE Data Compression Conference (DCC), (2016), pp. 620-620.

Liu, Zhenyu, et. al., "CU Partition Mode Decision For HEVC Hardwired Intra Encoder Using Convolution Neural Network". IEEE Transactions on Image Processing, vol. 25, No. 11, Nov. 2016, pp. 5088-5103.

Xu, Mai, et. al., "Reducing Complexity of HEVC: A Deep Learning Approach". IEEE Transactions on Image Processing, vol. 27, No. 10, (2018), pp. 1-17.

Zhu, Kongfeng, et. al., "No-Reference Video Quality Assessment Based On Artifact Measurement And Statistical Analysis". IEEE Transactions on Circuits and Systems for Video Technology, vol. 25, No. 4, (2015), pp. 533-546.

Yang, Ren, et. al., "Decoder-Side HEVC Quality Enhancement With Scalable Convolutional Neural Network". IEEE International Conference on Multimedia and Expo (ICME), Jul. 10-14, 2017, pp. 817-822.

Shi, Wenzhe, et. al., "Real-Time Single Image And Video Super-Resolution Using An Efficient Sub-Pixel Convolutional Neural Network". Proceedings of the IEEE Conference on Computer Vision and Pattern Recognition, (2016), pp. 1874-1883.

Chen, Tong, et. al., "DeepCoder: A Deep Neural Network Based Video Compression". IEEE Visual Communications and Image Processing (VCIP), (2017), 4 pages.

Yan, Ning, et al., "A Convolutional Neural Network Approach For Half-Pel Interpolation In Video Coding". IEEE International Symposium on Circuits and Systems (ISCAS), (2017), 4 pages.

Pfaff, Jonathan, et. al., "Intra Prediction Modes based on Neural Networks". Joint Video Experts Team (JVET) of ITU-T SG 16 WP 3 and ISO/IEC JTC 1/SC 29/WG 11, JVET-J0037-v1, Apr. 10-20, 2018, pp. 1-14.

Pfaff, Jonathan, et. al., "Intra Prediction Modes based on Neural Networks". Joint Video Experts Team (JVET) of ITU-T SG 16 WP 3 and ISO/IEC JTC 1/SC 29/WG 11, JVET-J0037 Presentation, Apr. 13, 2018, 19 pages.

Merkle, Philipp, et. al., "CE3: Non-Linear Weighted Intra Prediction (Test 6.1.1)". Joint Video Experts Team (JVET) of ITU-T SG 16 WP 3 and ISO/IEC JTC 1/SC 29/WG 11, JVET-K0266-v1, Jul. 10-18, 2018, 4 pages.

Bailer, Werner, et al., "Report of the AhG on Coded Representation of Neural Networks (NNR)". International Organization For Standardization, Coding Of Moving Pictures And Audio, ISO/IEC JTC1/SC29/WG11 MPEG 2018/M42289, Apr. 2018, 3 pages.

Cheng, Zezhou, et al., "Deep Colorization". Proceedings of the IEEE International Conference on Computer Vision, (2015), pp. 415-423.

Zhang, Rui, et al., "Fusion Of Images And Point Clouds For The Semantic Segmentation Of Large-Scale 3D Scenes Based On Deep Learning". ISPRS Journal of Photogrammetry and Remote Sensing, vol. 143, (2018), pp. 85-96.

Yue, Z. et al., "Dynamic Growing Self-organizing Maps for Surface Reconstruction from Point Clouds" Journal of Computer-Aided Design & Computer Graphics, vol. 28 No. 9, Sep. 2016 (8 pages).

Kui-Yang, S., "An Improved Local Geometric Feature Matching Method for Point Clouds" Modern Computer (Professional), Mar. 2018 (5 pages).

\* cited by examiner

SYSTEM AND METHOD FOR PROCEDURALLY COLORIZING SPATIAL DATA

CROSS-REFERENCE TO RELATED APPLICATIONS

The present application is a national stage application under 35 U.S.C. 371 of International Application No. PCT/US2019/065771, entitled "SYSTEM AND METHOD FOR PROCEDURALLY COLORIZING SPATIAL DATA", filed on Dec. 11, 2019, which benefit under 35 U.S.C. § 119(e) from U.S. Provisional Patent Application Ser. No. 62/779,758, entitled "System and Method for Procedurally Colorizing Spatial Data," filed Dec. 14, 2018, which is hereby incorporated by reference in its entirety.

BACKGROUND

As virtual reality (VR) and augmented reality (AR) platforms are developing towards being ready for mass adoption by consumers, demand for spatial content enabling per-viewer six degrees of freedom (DOF) free view point inspection is increasing.

Demand for mixed reality (MR) content that allows users to experience a full 6-DOF navigation within the content may call for new methods of content capture and production. MR users may desire immersive experiences in which the users are able to virtually visit distant physical places. Achieving a level of realism that creates the illusion of being present at another physical location may call for the use content with high quality spatial data. However, high quality spatial data may consume excessive amounts of bandwidth or memory. Optimization approaches, such as reducing the color information that needs to be sent, may be particularly useful. Furthermore, spatial capturing sensors such as lidars may produce only point cloud data without color information.

One standard for 3D content includes polygonal 3D graphics, e.g., graphics produced by modeling and rendered with tools and techniques such as those used for creating real-time 3D games. However, emerging MR displays and content capture technologies (e.g., VR HMDs such as Facebook Oculus & HTC Vive, AR HMDs such as HoloLens and Meta, RGB-D sensors, light field cameras, etc.) may call for new methods of producing and distributing immersive spatial 3D content.

Besides MR driving the development of reality-capture technologies, the advancement of human-computer interactive systems may call for some such systems to achieve greater spatial awareness. Environment sensing technologies that enable a structural understanding of the environment are increasingly being implemented in smart home environments, automotive systems, and mobile devices. These spatially aware systems may produce huge amounts of geometric data in the process of collecting the spatial data to be used as content for immersive experiences. However, high quality spatial data may consume excessive amounts of memory, bandwidth, and processing resources. Furthermore, devices producing point clouds with high accuracy, such as lidar, may capture only the 3D positions of sampled points in the environment without color information. Other spatial capturing solutions, such as time-of-flight (ToF) cameras, often produce just raw geometry. Rendering a realistic view of the captured scene may call for color information in addition to the raw geometry or 3D positions of sampled points. Furthermore, even in cases when there is color information associated with the spatial data, the use of spatial data as a content may call for optimization and/or changing the colors to follow a certain look and style desired for the virtual experience.

Recent development of deep learning techniques for training neural networks for computer vision tasks have led to efficient 2D image analysis solutions for tasks such as object detection from images and style transfer between images. Techniques for 2D image processing tasks where neural networks have produced impressive results include the techniques for automatic colorization of black and white photographs described in Zhang et al., "Colorful image colorization," in: *European Conference on Computer Vision*, Springer International Publishing, 2016. p. 649-666; and in Zhang et al., "Real-time user-guided image colorization with learned deep prior," *arXiv preprint arXiv:*1705.02999, 2017. Solutions for black and white photograph colorization focus on processing of a single frame.

Having full color information for each captured scene data point may increase the amount of data storage to an extent such that the data amount becomes prohibitively large for distribution via network communication. This may call for data optimization, which may be implemented, for example, by completely removing or reducing data points in the spatial data that contain color information.

SUMMARY

In some embodiments, a method is provided for decompressing compressed point cloud data. In an example, a decoder receives a bitstream that encodes at least (i) geometry information for a point cloud, (ii) neural network parameter data, and (iii) a residual color signal. The decoder produces color prediction data for the point cloud by supplying the geometry information as input to a neural network characterized by the received neural network parameter data. The decoder adds the residual color signal to the color prediction data to generate a reconstructed color signal for the point cloud.

In some embodiments, a representation of the point cloud with its associated reconstructed color signal may be rendered. The representation may then be caused to be displayed to a user. The representation may be a 2D representation or a 3D representation.

The neural network parameter data may include a set of neural network weights, or it may include information (e.g. a link or address) identifying a stored set of neural network weights that can be retrieved by the decoder, either locally or over a network. The neural network parameter data may include differential weight information that identifies differences between the weights to be used for decoding and a reference set of weights.

In some embodiments, the bitstream further encodes color hint data. In the production of the color prediction data, the color hint data is supplied as input to the neural network. The color hint data may include local color hint data having at least one color sample of at least one respective position in the point cloud. Additionally or alternatively, the color hint data may include global color hint data such as color histogram data or color saturation data.

In some embodiments, the production of color prediction data further includes supplying a previously-reconstructed color signal of a previously-reconstructed point cloud as input into the neural network.

In some embodiments, the color prediction data produced for the point cloud includes luma and chroma information for each of a plurality of points in the point cloud. In other embodiments, other types of color coordinates may be used.

In some embodiments, the point cloud geometry information is encoded in the bitstream in a compressed form. In such embodiments, the decoding method may further include decompressing the geometry information.

In some embodiments, the geometry information for the point cloud comprises position information (such as x,y,z coordinates) for each of a plurality of points in the point cloud.

In some embodiments, a method is provided for generating compressed point cloud data. In an example, an encoder receives point cloud geometry information along with corresponding original color information (which may be luma and chroma values for each point in the point cloud). The encoder supplies at least the geometry information to a neural network to produce color prediction data for the point cloud. The encoder generates a residual signal representing the difference between the color prediction data and the original color information. The encoder encodes the point cloud geometry information (e.g. in compressed form) and the residual signal in a bitstream.

In some such embodiments, the encoder further encodes parameter data for the neural network into the bitstream. The neural network parameter data enables a decoder to reproduce the neural network used by the encoder. For example, the neural network parameter data may include a link, address, or other identifier of the neural network. The neural network parameter data may include weights of the neural network.

In some embodiments, the encoder trains the neural network on the point cloud geometry information and the corresponding original color information.

Additional embodiments described herein include systems comprising a processor and a computer-readable medium (e.g. a non-transitory computer-readable medium) storing instructions operative to perform any of the methods described herein, including encoder and decoder methods. Further embodiments include apparatus comprising a processor configured to perform any of the methods described herein, including encoder and decoder methods.

Further embodiments include a computer-readable medium (e.g. a non-transitory computer-readable medium) storing point cloud information encoded according to the methods described herein.

EXAMPLE NETWORKS FOR IMPLEMENTATION OF THE EMBODIMENTS

Figure 1A:
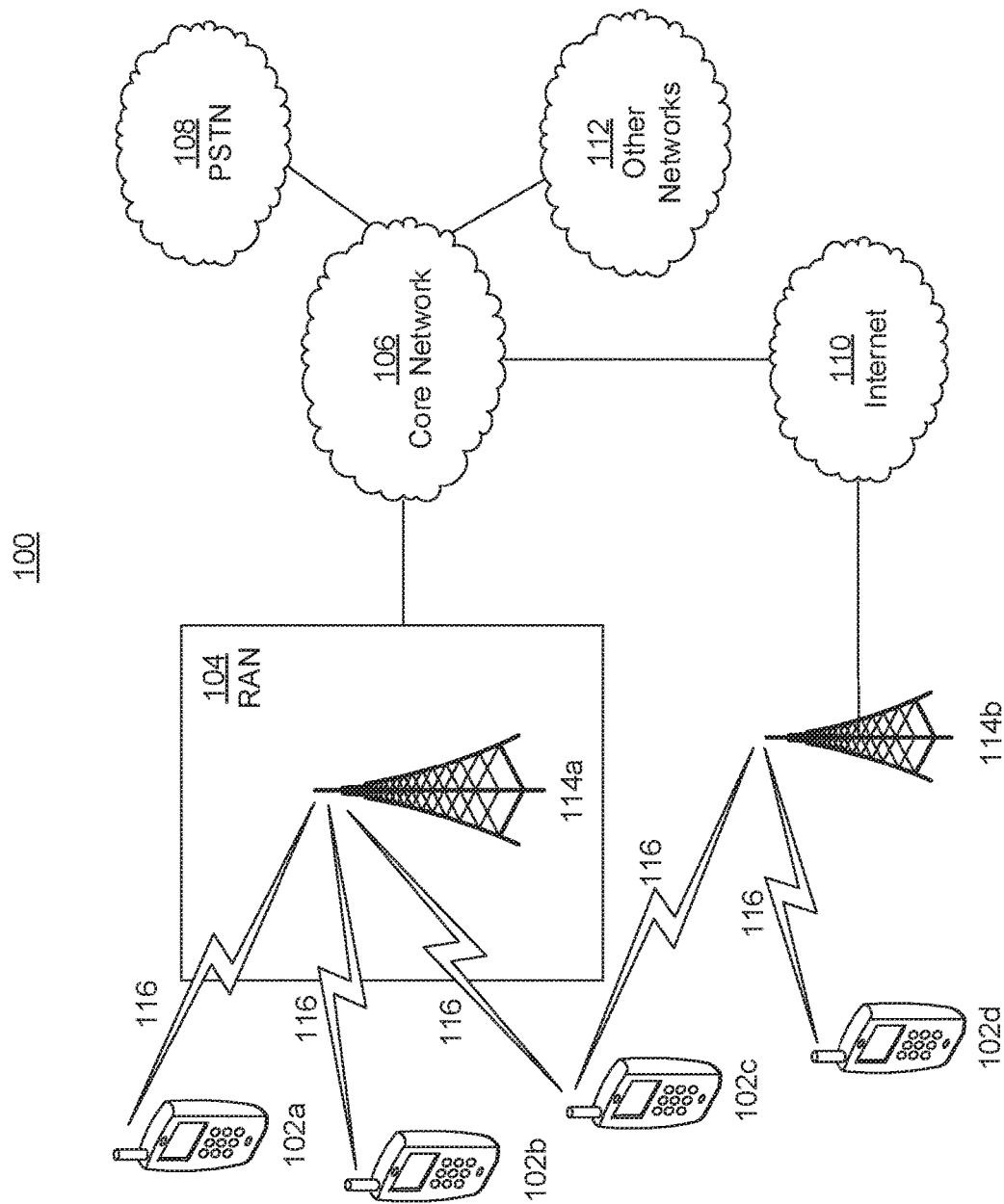
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
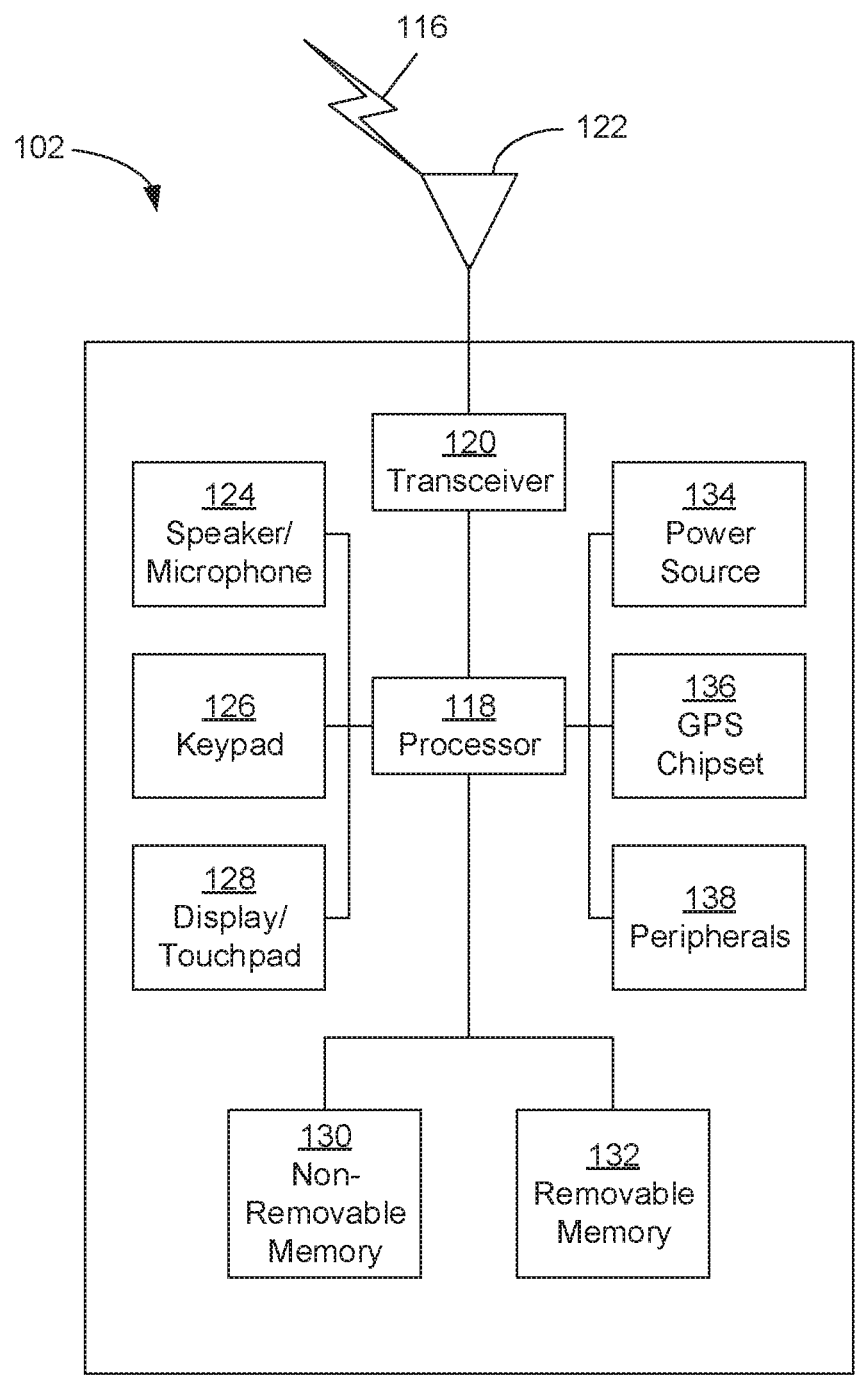
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Although the WTRU is described as a wireless terminal, it is contemplated that in certain representative embodiments that such a terminal may use (e.g., temporarily or permanently) wired communication interfaces with the communication network.

In view of FIGS. 1A-1B, and the corresponding description, one or more, or all, of the functions described herein may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

Systems and methods are described for compressing color information in point cloud data. In some embodiments, point cloud data includes point position information and point color information for each of a plurality of points. The point position information of the point cloud is provided to a neural network (e.g. a convolutional neural network), and the neural network generates predicted color information (e.g. predicted luma and chroma values) for respective points in the point cloud. A prediction residual is generated to represent the difference between the predicted color information and the input point color position. The point position information (which may be in compressed form) and the prediction residual are encoded in a bitstream. In some embodiments, color hint data (e.g. point color information for a subset of the points) is also provided to the neural network to improve color prediction, and the color hint data is encoded in the bitstream.

In some embodiments, connection weights or other information characterizing the neural network is also encoded in the bitstream. The information characterizing the neural network may include information identifying one neural network out of a plurality of available neural networks.

In some embodiments, a decoder receives the bitstream and reconstructs the point position information of the point cloud. The point position information is provided to a neural network (e.g. a predefined neural network, or a neural network characterized by information encoded in the bitstream). If color hint data is encoded in the bitstream, the color hint data may also be provided to the neural network. The neural network generates predicted color information for each of a plurality of points in the point cloud. If a prediction residual is encoded in the bitstream, the prediction residual is added to the color information to generate reconstructed color information for the points in the point cloud. The points in the point cloud, together with their respective reconstructed color information, may be rendered for display to a user.

In some embodiments, a method includes procedurally generating and changing color information for spatial data. Procedurally colorized data may be implemented for purposes including optimizing the data transmissions by reducing or removing color information contained with the spatial data. In addition to a single frame colorization, some embodiments may operate to address the problem of temporal consistency. In case of dynamic spatial content with several temporal steps, it may be useful to implement temporal stabilization with the colorization process in order to maintain a consistent content look throughout the experience.

Some embodiments may operate to optimize content distribution. For example, instead of sending spatial data that contains color values associated with each data point, a server may stream spatial data with sparse color value sampling or provide color values via reference images (or global histogram and saturation values). Some embodiments may operate to addresses temporal stability of the colorization across different time steps of the content, in order to achieve a consistent look throughout an experience (e.g., a VR, AR, or MR session).

In some embodiments, procedural generation of color information is provided for spatial data consisting of geometry alone. For example, lidar data captured from a moving vehicle may be transformed from plain point cloud data without point colors into a 3D content that can be visualized as six degrees of freedom (6-DOF) content with realistic colors.

In some embodiments, colorization is performed using spatial data that consists of only raw geometry information without any prior color information, thus allowing efficient compression and use of such data as a content for virtual experiences. Some embodiments operate to enable the re-colorization of spatial data with existing color information so that the content can be modified to be suitable for various kinds of virtual experiences.

In some embodiments, a neural network is trained to infer color information on a per viewpoint basis for the spatial data, without requiring input from the user or any other additional information. In some embodiments, the colorization inferred by the neural network may be guided so that certain colors can be designated for specific elements in the scene or so that the overall visual outlook of the colorization follows a given example.

In some embodiments, procedural generation of color information is performed using spatial data that does not originally include such information. Such embodiments may operate to enable the reduction of the amount of data to be transmitted when streaming the spatial data by reducing or completely removing the color information from the spatial data.

In some embodiments, the colorization results from previous temporal steps are included as input for the current temporal steps, thus improving the temporal stabilization of the colorization.

Process Overview

An example process executed by the viewing client may include the following steps. The client receives or loads information characterizing a neural network (e.g. information on connectivity and weights of the neural network) to be used for inferring color information. The client receives spatial data of a point cloud. The client may also receive reference images. A user-provided reference image may be used, or a search may be conducted for a reference image from, for example, map services. A viewpoint to the spatial data is determined. The viewpoint may be set based on user input and display device tracking. The client may perform an operation to triangulate spatial data if needed for the area visible from the selected viewpoint. The client renders a 2D view of the spatial data using single color and default lighting. The client may adjust a weighting between a previous colorization result stored on a previous processing time step of the colorization process and reference image. When reference image is used on the beginning of continuous colorization processing, it is weighted more than previous colorization result. However, as processing continue, the previous colorization used as a global hint may be given more weight in order to maintain temporal continuity on colorization result across different time steps of the session.

The client infers colors for the rendered 2D view using a neural network trained for the task. Inputs for the neural network may include: a rendered 2D view of the spatial data; global hints, such as previous colorization results and/or reference images, mixed according to the weighting described above; and local hints, which may be color values already associated with geometry data points visible from the current viewpoint. The color values of the local hints may be part of the received spatial data stream, or they may be color values associated with the geometry based on previous time steps of the colorization processing.

The client may then project inferred colors from the produced 2D image back to the spatial data and store as values associated with the spatial data vertices or points. The client may further store the colorized 2D view to be used as a global hint in the next time step of the continuous colorization process.

Some embodiments may operate to implement content distribution from a content server to a viewing client. An example process executed by the content server may include the following steps. The server waits for content request from a viewing client. In response to a client request for spatial data, available communication bandwidth is estimated. The server selects a neural network to be used for colorization and sends data characterizing the neural network (e.g. connectivity or weight information, or a link to such information) to the client.

For each time step of the spatial content streamed to the client, the distributed content is processed as follows. Color information is reduced, either by completely removing color information or by reducing it for example from three component RGB to just single component irradiance. The server then colorizes the spatial data to be sent using the same neural network and the same processing techniques as the viewing client. The server may iteratively add hints to be sent along the optimized content. For example, the server may compare the colorization result with the original data, add hints to provide a better coloring match between optimized data and original data, and generate a new colorization result to compare with the original data. New hints may be added in this way, so long as any bandwidth and per-frame processing limits are satisfied, until a desired quality level is reached. Global hints may be generated by extracting global histogram and saturation information from the 2D view of the original data. Local hints may be generated by adding color samples from the original data. The color-reduced (or color-free) data are sent to the client along with the global and/or local hints, and the process may be repeated for additional frames.

Although the approach to content distribution optimization is mainly discussed from the point of view of spatial data distribution, the methods described herein for content distribution optimization may be implemented with many types of sequential visual data including, for example, 2D video, 360 degrees field of view video, light fields, etc.

Exemplary Processes

Figure 2:
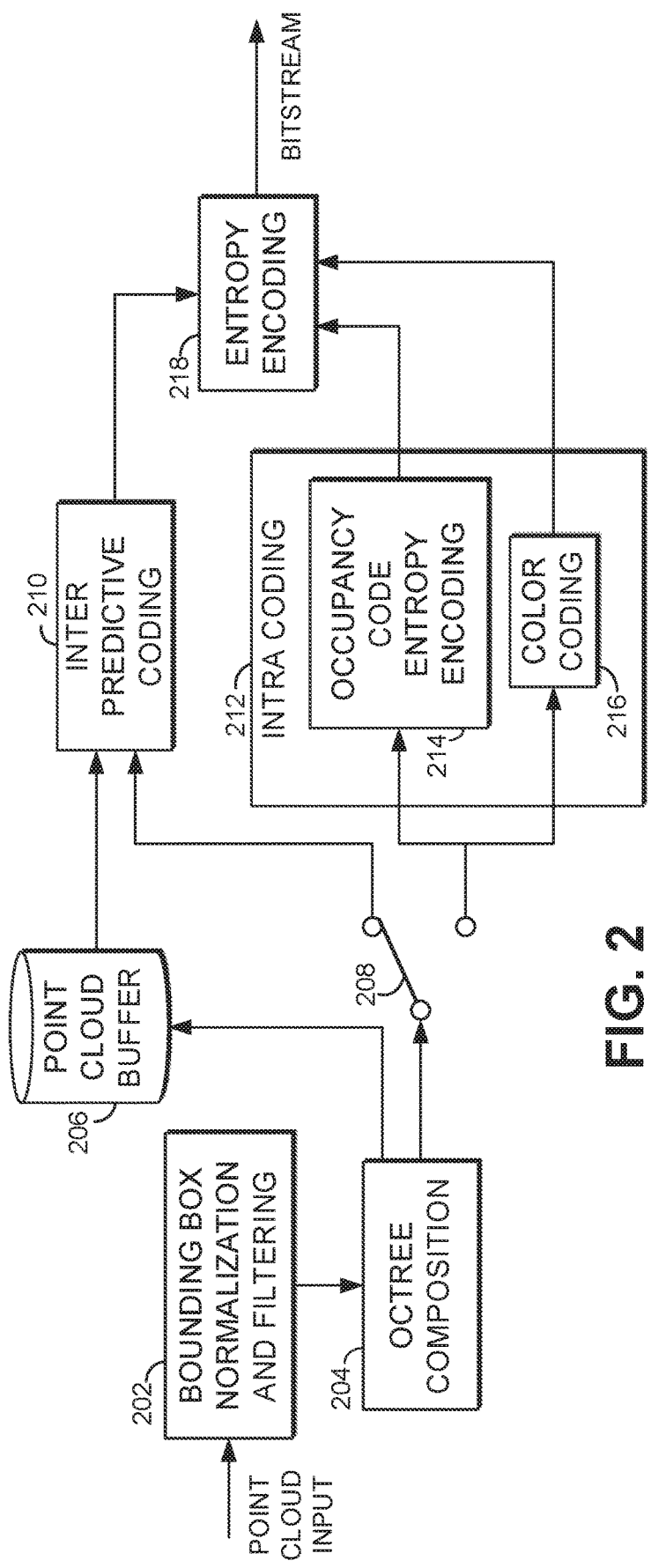
FIG. 2 is a functional block diagram of a point cloud encoder that may be used in some embodiments.

FIG. 2 illustrates a point cloud encoder that may be used in some embodiments. The point cloud encoded of FIG. 2 includes the capability of encoding color information in a conventional way. However, in embodiments described herein, a point cloud encoder such as that of FIG. 2 may be used to encode point cloud geometry information alone, or it may be used to encode point cloud geometry information together with reduced color information (e.g. luma information without chroma information). As illustrated in FIG. 2, a point cloud input is provided to a bounding box normalization and filtering module 202. The output of module 202 is provided to an octree composition module 204. The output of module 204 may be stored in a point cloud buffer 206. A determination of whether to use intra coding or inter coding for the point cloud (or for a portion thereof, such as a block within an octree) is effectuated at 208. An inter predictive coding module 210 encodes point clouds (or portions thereof) that are coded using inter predictive coding. An intra coding module 212 encodes point clouds (or portions thereof) that are coded using intra coding. The intra coding module 212 may include a module 214 for occupancy code entropy coding and a module 216 for color coding. In some embodiments, the color coding module 216 may be omitted entirely. The inter and intra coding information may be entropy coded by module 218 into a bitstream. Example techniques for the encoding of point cloud data are described in greater detail in Mekuria et al., "Overview of the MPEG Activity on Point Cloud Compression," *Data Compression Conference (DCC)*, 2016, IEEE.

Figure 3:
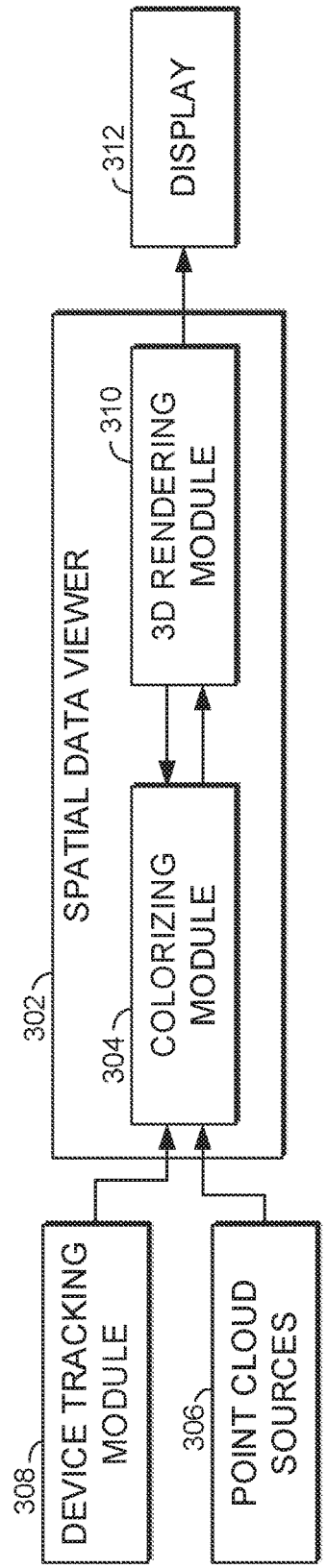
FIG. 3 is a block diagram of a system that operates to procedurally colorize spatial data, in accordance with some embodiments.

FIG. 3 is a block diagram of a client-side system that procedurally colorizes spatial data, in accordance with some embodiments. The spatial data viewer 302 performs spatial data colorization with colorizing module 304. The spatial data viewer may receive raw spatial data, for example, from sensors such as lidars (e.g. embedded in cars), from content repositories containing pre-recorded spatial data, from content servers distributing the spatial data over a network connection, or from other sources 306.

In some embodiments, the spatial data viewer sets the viewpoint to the spatial data based on user input. User input may include navigation commands provided by the user via available input devices. In some embodiments, device tracking using a device tracking module 308 is implemented in order to provide the 3D position and/or orientation of the viewing device (e.g. a head mounted display).

In some embodiments, the spatial data viewer generates color information for the spatial data based on the spatial data, the viewpoint set to the spatial data, and reference image(s). Color information may be generated using a neural network that infers color values given the input. The spatial data viewer may use 3D rendering 310 to process spatial data into a format suitable for neural network model input. The spatial data viewer may produce a final view of the spatial data once the colorization has been performed. An image produced by 3D rendering the colorized spatial data may be sent to the display 312.

Figure 4:
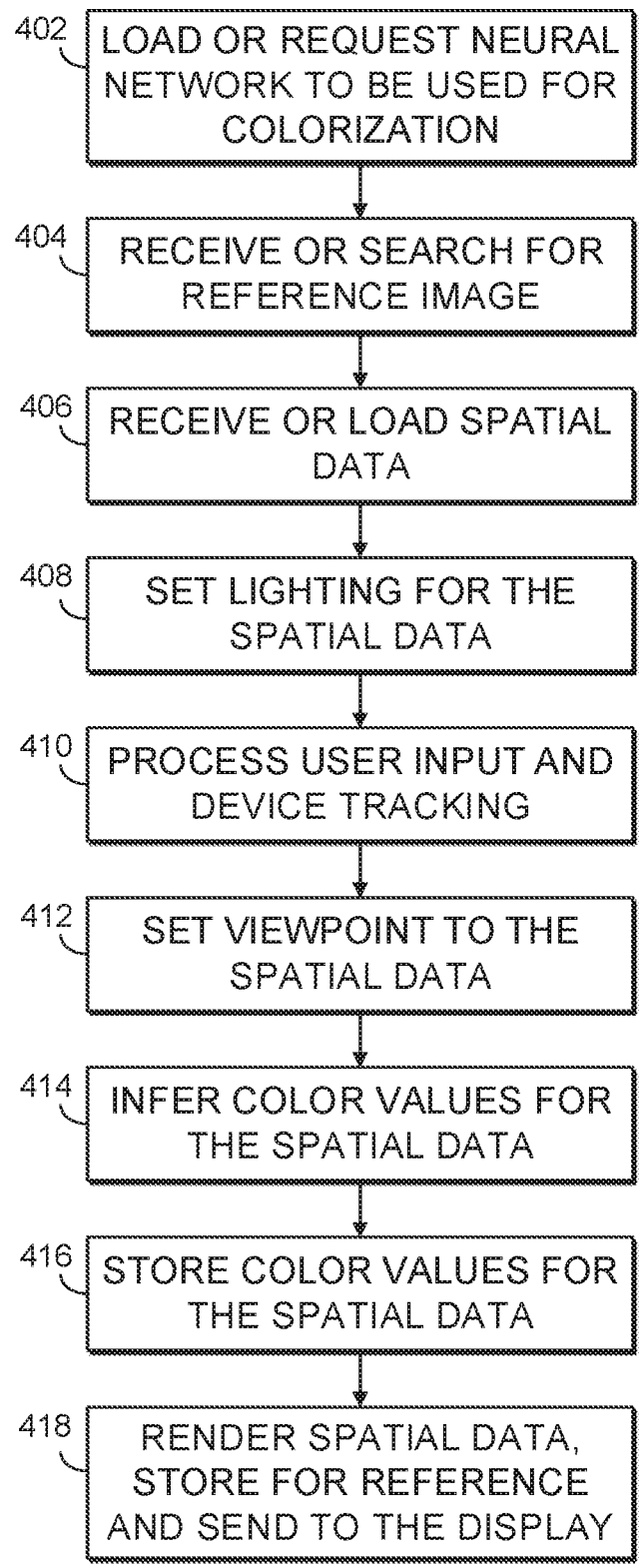
FIG. 4 is a process flow diagram of a method of colorizing spatial data executed by the spatial data viewer, in accordance with some embodiments.

FIG. 4 is a process flow diagram of a method of colorizing spatial data executed by a spatial data viewer, in accordance with some embodiments. The process may include the steps detailed in the sections below.

Load or Receive Neural Network

At box 402, the client device loads or requests a neural network to be used for colorization. In some embodiments, a convolutional neural network is used for colorizing spatial data. The convolutional neural network may be trained for inferring color values for uncolored 2D images rendered of spatial data. The inputs of the neural network may include, for example, a monochromatic image rendered of the spatial data, a reference image providing global hints for colorization, and sparse sample values that may provide local colorization hints. The neural network may colorize the input image based on the input image, reference image and sparse local hints.

In some embodiments, the spatial data viewer receives spatial data from a content server. The content server may provide the neural network to be used for colorizing the spatial data. The content server may remove the color information from the spatial data in order to reduce the amount of data to be transmitted from the server to the spatial data viewer. It may be helpful to reduce the amount of data, for example, in order to optimize data transmission. In some embodiments, the server may have a dedicated neural network model for the spatial data viewer to use. The dedicated neural network model may be tuned to sufficiently match the type of content being transmitted. In some embodiments, the content server provides reference images to guide the colorization performed at the client side. In some embodiments, the content server includes local color hints by providing color values for a small number of points or vertices in the spatial data that it sends to the client.

In some embodiments, the spatial data viewer can load an existing neural network. For example, the spatial data viewer may locally store a neural network that has been trained or received prior to a current session. This approach may be implemented, for example, when the spatial data viewer is used for colorizing and visualizing data received directly from a sensor producing spatial data, or for visualizing locally stored spatial data. It may also be helpful to use a pre-stored local copy of a neural network in some embodiments wherein spatial data is received from a content server.

The neural network model may refer to neural network architecture including, e.g., a description of layer connections, sizes of convolution filters for each layer, pooling layers and fully connected layers combined for the task, and weights of the connections between layers. Existing deep learning frameworks may be used for training, storing and loading of the neural networks for the colorization task. Suitable frameworks may include, for example, Tensorflow, Keras, Caffe, CNTK, and Torch. The operation of the neural network model is further described in the section below entitled "Process User Input and Device Tracking."

Receive or Search for Reference Image

At box 404, the client device receives or searches for a reference image. In some embodiments, the neural network used for colorizing the spatial data uses a reference image and associated capture view points for guiding the colorization. In some embodiments, the capture point may be estimated from analysis of the scene geometry and grayscale image projections. The reference image may provide global hints for the colorization, which may guide the colorization towards producing a global histogram and saturation similar to the inferred color image that is featured in the reference image. The spatial distribution of colors between reference and the inferred color image may not need to match; rather, the global hints may provide a color scheme to be reproduced by the network for the output image. Alternately, a desired global histogram may be provided from the scene to the neural network allowing the network to synthesize spatial color variation.

In some embodiments, the method in which a reference image is received may depend on the settings of a particular session. Methods of receiving reference images include, for example, i) receiving reference images from the content server that provides the spatial data, ii) receiving reference images provided by a user or application, iii) receiving captured image data, and iv) receiving reference images from a performed search for suitable reference images using available image data sources.

In some embodiments, the spatial data may be associated with metadata that provides the geolocation from where the data is captured. This geolocation information may be particularly useful for searching for suitable reference images. For example, the spatial data viewer may use the geolocation information to search for reference images that match the location. Map services such as Google Street View may be utilized for the image search. An image received from the map service may be used as a reference image. The camera location and orientation may be inferred from the reference image(s) and the geometry data.

Receive or Load Spatial Data

At box 406, the client receives or loads spatial data. Spatial data (e.g., 3D data featuring the geometry of a scene) may be implemented as an unordered point cloud or as a 3D mesh featuring vertices and connectivity between vertices. The spatial data may include information such as color or normal definitions for the points or vertices. In case the spatial data already includes color information, it may be useful to discard the existing color information or selectively use part of the color information as local coloring hints to guide re-colorization.

Set Lighting for the Spatial Data

At box 408, lighting for the spatial data may be set. Virtual lighting for the spatial data may be implemented. For example, a monochromatic 2D image of the spatial data from the selected viewpoint may be rendered using a virtual lighting setup. The same virtual lighting setup may be used for rendering the final colorized view to the display. In some embodiments, the virtual lighting used is set manually by a user. In some embodiments, the virtual lighting is determined by the spatial data viewer. The virtual lighting may be determined, e.g., based on heuristics related to the experience type, based on default values, or based on part of the metadata associated with the spatial data. In some embodiments, the lighting is determined by inferring the lighting setup featured in the reference image. In some embodiments, the lighting of the scene can be constructed based on object recognition from the spatial data. For example, objects in a scene such as a lamp, window, or the sky may be recognized and modeled as light sources for virtual lighting.

Process User Input and Device Tracking

At box 410, the client processes user input and device tracking information. Spatial data may enable the freedom of navigation when inspecting the data. In order to enable a full 6-DOF viewing of the spatial content, the spatial data viewer may allow a user to navigate the data using input commands. In addition to setting the viewpoint to the spatial data based on navigation commands (e.g. provided by the user using explicit input commands), device tracking information may be requested. By using the device tracking information, the navigation of the spatial data may be configured to follow the motion of the device. Such methods may be used to provide immersive data inspection using HMDs.

Infer Color Values for the Spatial Data

Figure 5:
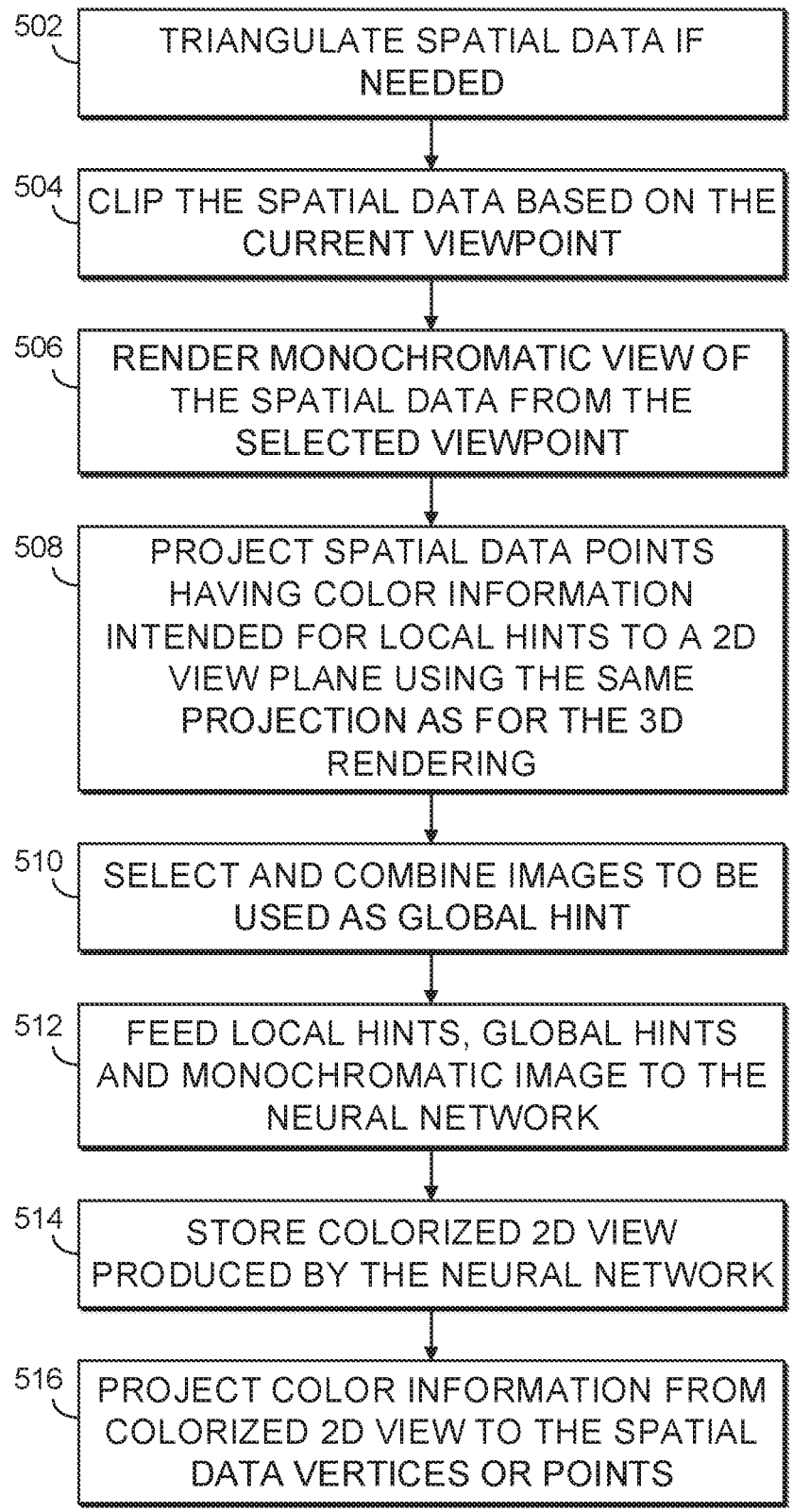
FIG. 5 is a process flow diagram of a method of colorizing spatial data for a selected viewpoint, in accordance with some embodiments.

At box 414, the client infers color values for the spatial data. A sub-process of inferring color values for the spatial data may include preparing the inputs for the neural network and storing the output produced by the neural network. Further details of this sub-process are illustrated in FIG. 5. As illustrated in FIG. 4, the client may further store the color values for the spatial data, render the spatial data, and store the colorized spatial data for reference.

FIG. 5 is a process flow diagram of a method of colorizing spatial data for a selected viewpoint, in accordance with some embodiments. If the spatial data consists of raw point cloud data, the method may include triangulating the point cloud data (box 502). For example, connections between points may be added, thus creating polygons that connect the points. In some cases, such as for large point clouds, it may be helpful to limit triangulation to partial areas of the point cloud according to the selected viewpoint.

Once the spatial data is in a mesh format generated by connecting points, it may be clipped (box 504). For example, polygons may be cut to match the current viewpoint and data falling outside the viewpoint may be removed. Then the clipped geometry may be rendered (box 506) using, for example, the previously described virtual lighting setup and using a single color for the whole geometry. This creates a monochromatic image which may be colorized by the neural network. Before feeding the monochromatic image to the neural network, the process may include preparing local and global hints. These hints may be fed to the neural network to guide the colorization, as discussed below.

Local hints may include points in the spatial data with pre-determined color values. Local hints may be collected and transformed into 2D image coordinates so that they can fed to the neural network. Spatial data may contain color values that have been created in previous temporal execution steps. It may be helpful for these color values to remain constant between each execution time step. The original spatial data may contain color values that are desired to be maintained. For example, some specific objects may be defined to be of a specific color. These points with existing color values may be transformed by projection (box 508) from their original 3D space to the 2D view space using the same projection that has been used for rendering the monochromatic image. Local hints may be fed to the neural network as vectors consisting of the 2D image location and the color value.

Global hints may include images that guide what kind of global histogram and saturation the inferred colorization should feature. From a reference image, a global histogram and saturation values may be extracted using a specific input branch in the neural network so that a global hint can be fed to the network as a 2D image. Because the rendering process may be continuously executed while a user interactively navigates the spatial data, it may be helpful to provide consistency in the colorization between different execution time steps. This may be achieved by storing the final rendered image of each time step and feeding that image into the network as global hint. The final rendered image of the previous time step may be fed to the network in a manner similar to the reference image (e.g. using a specific input branch). The reference image and previously rendered final image may be combined (box 510) by adjusting a weighting that affects how much each image impacts the colorization. In some embodiments, the weight of the reference image may be reduced over time in order to give more weight to the previously rendered images.

When the inputs for the neural network have been collected and processed into a format that can be fed to the network, the process may further include using the neural network to infer color values for the rendered monochromatic image. Inferring color values may be performed by feeding the inputs to the neural network (box 512) and storing the output. In some embodiments, the neural network is a convolutional neural network consisting of four input branches: one main branch for the monochromatic image processing, and three side branches for taking in the local and global colorization hints. The neural network architecture employed in some embodiments may be constructed using solutions similar to the one described in ZHANG, Richard, et al., "Real-time user-guided image colorization with learned deep priors," *arXiv preprint arXiv:*1705.02999, 2017. The network may be retrained by using weights used for the original black and white photo coloring and tuning them with additional training material featuring monochromatic and correctly colored spatial data renderings. The colorized image output by the neural network may be stored (box 514). Values from the image may be projected back to the spatial data and stored as per vertex or point color on the original spatial data (box 516).

Render View to the Display

Referring back to FIG. 4, at box 418, After the spatial data visible to the current viewpoint has been colorized, it may be rendered and sent to the display. In the rendering of the colorized spatial data, the 2D image to be sent to the display may be rendered to any resolution the display requires. Lighting models may be used, for example to account for global illumination and color bleeding caused by radiation of lighting energy between surfaces.

The final rendered image may be stored so that it can be used as a reference in following execution time steps. This may be helpful to create a level of consistency in the general coloring of the spatial data between consecutive processing time steps.

Progress to Process Next Time Step

Once the final image has been rendered and displayed (FIG. 4, box 418), the process may repeat from the step of receiving new instances of reference images (box 404) and spatial data (box 406). The process may iterate even if no new reference image or spatial data are provided. For example, if a user navigates to view the data from a new viewpoint, the process of colorizing the spatial data may repeat for embodiments in which colorization is performed on a per-viewpoint basis.

Processing Executed by the Content Server: Using Colorization for Content Distribution In some embodiments, a determination may be made as to whether the content server or the viewing client performs the colorization. With this approach, the client may perform the colorization as described herein. In order to reduce the amount of data to be transmitted between the server and the client, the server may execute the same neural-network-based colorization as the client to estimate and add local hints that are sent to the client. In this way, content distribution may be optimized while maintaining a desired quality of the colorization.

Figure 6:
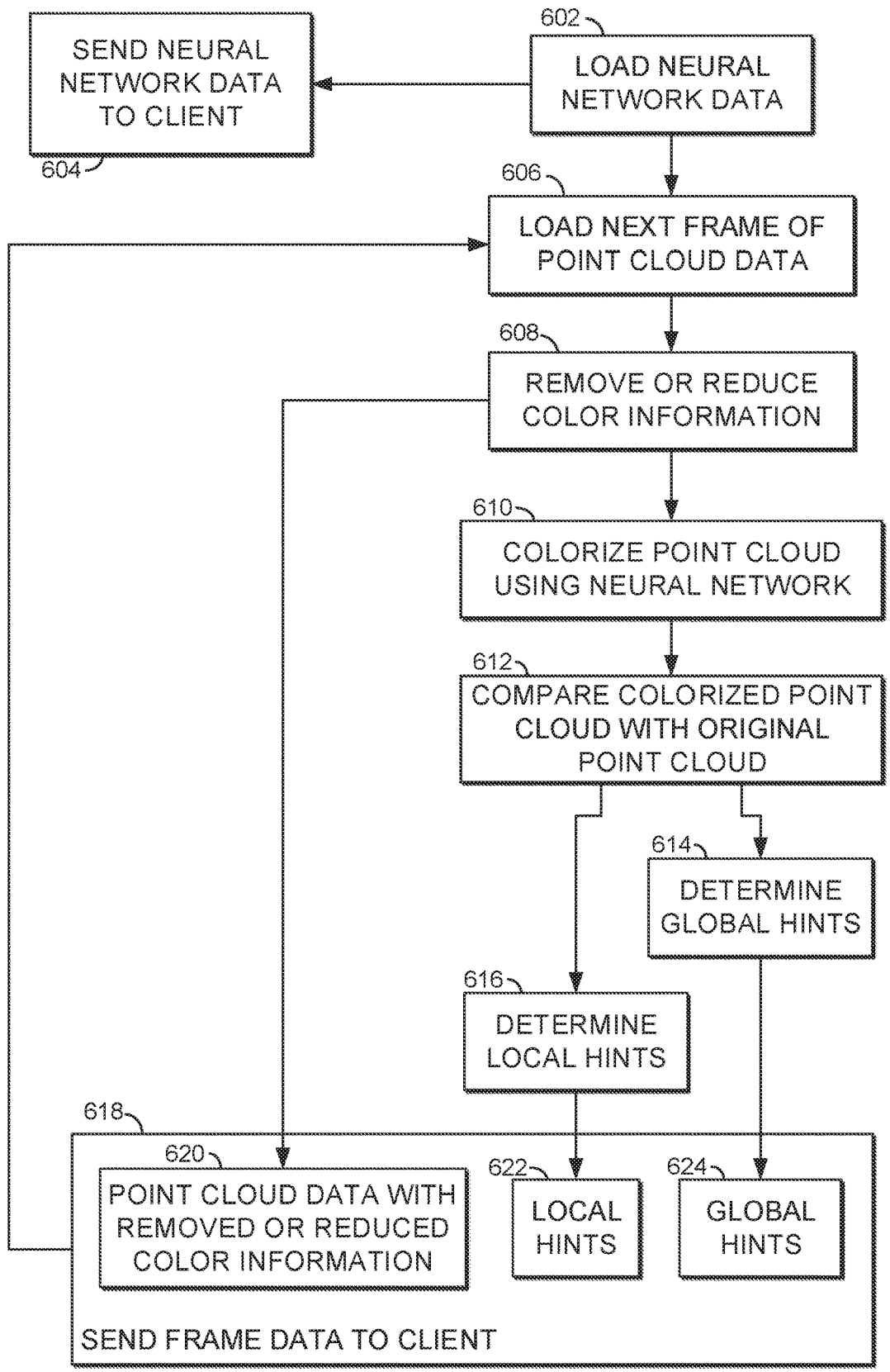
FIG. 6 is a process flow diagram of a method of encoding point cloud data for delivery to a client according to some embodiments.

FIG. 6 is a process flow diagram of a method for reducing the amount of point cloud color data to be sent from a server to a client using procedural colorization. At box 602, a server loads neural network data (e.g. weights) for color prediction. A box 604, the server sends the neural network data to the client. At box 606, the server loads a frame of point cloud data. At box 608, the server removes (or reduces) color information from the point cloud. At box 610, the server re-colorizes the point cloud using the neural network. In step 612, the server compares the re-colorized point cloud with the original point cloud. Based on the comparison, the server determines whether to provide local and/or global color hints. The determination may be made based on, for example, a level of error (e.g. a sum of absolute differences) between the original point cloud and the re-colored point cloud. For example, if the level of error is below a threshold, a determination may be made to provide no hints, or to provide only a default number and type of hints. If global hints are to be provided, the global hints may be determined at box 614, and if local hints are to be provided, the local hints may be determined at box 616. At box 618, the point cloud frame data is sent to the client. The data sent to the client may include point cloud data 620 with removed or reduced color information, local hints 622 (if any), and global hints 624 (if any).

In addition to spatial data, the process executed by the content server may be used with many types of sequential visual data, such as 2D video, 360 degree field of view video, light fields, etc.

Example Compression Applications

Figure 7:
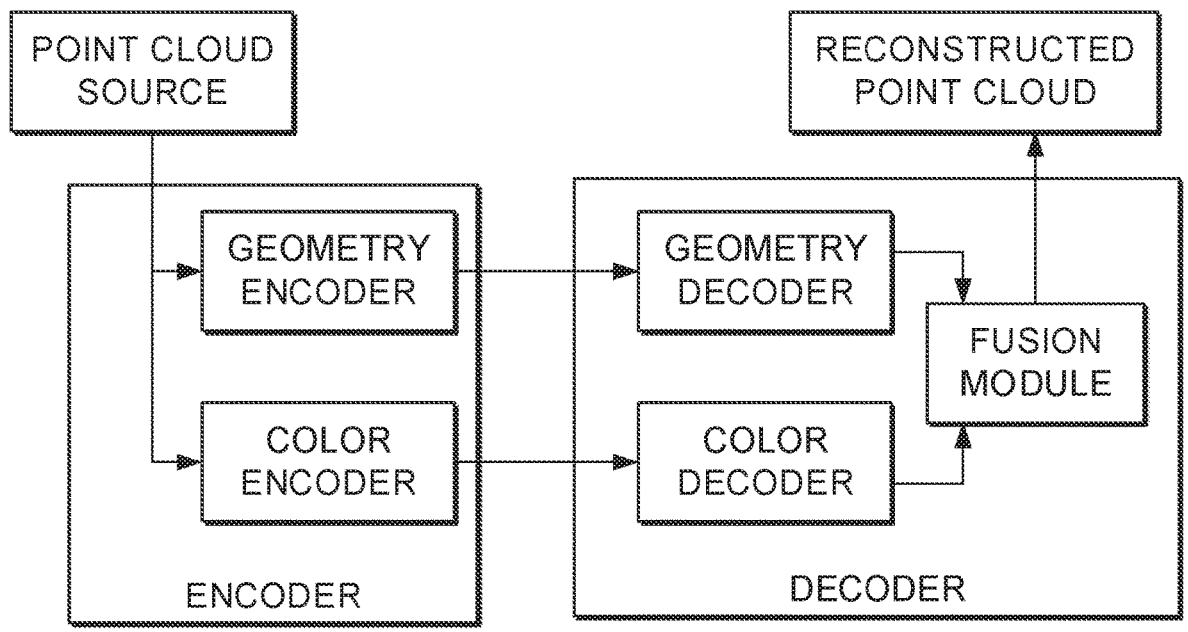
FIG. 7 is a functional block diagram of a point cloud encoder and corresponding decoder in an embodiment in which the encoder sends both a geometry code stream and a color code stream.

Example methods of colorizing spatial data may be employed in a compression system. FIG. 7 depicts a conventional point cloud encoder and corresponding decoder, with an encoder that sends both geometry and color information. The geometry information may be lossless or lossy coded. Typical color encoding may use conventional 2D pixel compression methods on projections of the point cloud data. Custom tools may be used, such as Region-Adaptive Hierarchical Transform described in de Queiroz, Ricardo L., and Philip A. Chou. "Compression of 3d point clouds using a region-adaptive hierarchical transform." *IEEE Transactions on Image Processing* 25.8 (2016): 3947-3956.

Figure 8:
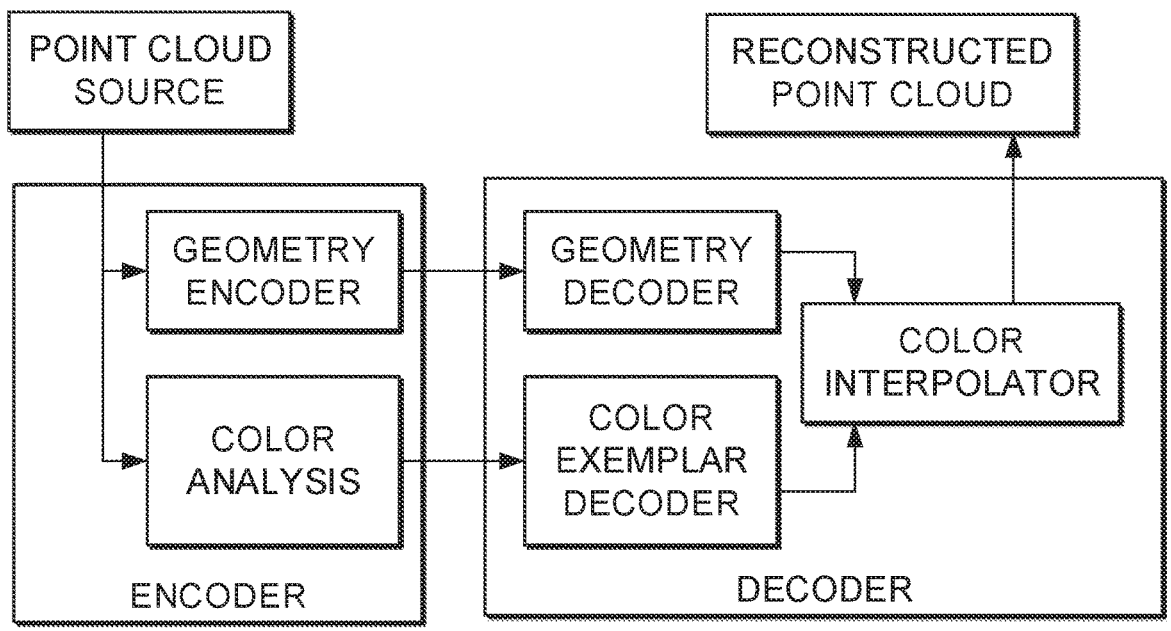
FIG. 8 is a functional block diagram of a point cloud encoder and corresponding decoder in an embodiment in which the point cloud encoder performs color analysis.

In some embodiments, a method of colorizing spatial data is used in a compression system. In such embodiments, the color code stream can be eliminated or greatly reduced. The color encoder may be replaced with an analysis agent that determines a colorizer model and possible a set of exemplary colors to drive the colorizer model. FIG. 8 depicts a point cloud codec including a point cloud encoder with color analysis, in accordance with some embodiments. The system may use a family of parameterized colorizer models and signal the model through the set of parameters.

More generally, the system may provide a complete neural network (e.g. parameters indicating the structure and/or connection weights of a neural network) for producing the colorization. The temporal frequency at which the model is communicated may vary. For example, the model may be signaled infrequently, e.g. it may be signaled at scene transitions. As another example, the model may be signaled periodically, e.g. at every random-access point. As another example, the model may be signaled with each frame. The encoder may, for example, determine when an updated model is necessary, and may add signaling into a bitstream to indicate parameters of the updated model to be used in the decoding. In the case of a single known model (e.g. a single model known to the decoder side), the model may never be signaled. Similarly, the color hints may be provided at the same frequency as the colorizer model or more or less frequently than the colorizer model is signaled.

As illustrated in FIG. 8, a colorizer model driven by different color hints can give different character to the same geometric data. The system may provide sets of different color hints, and the decoder may select one set to produce colorized output. The selected set may be based on local conditions at the decoder, e.g., time of day, ambient light, and/or display technology.

The colorizer model may be implemented by a neural network. It may be useful to implement encoder only mode selection or motion search, wherein a neural network is used to control a conventional video encoder in order to reduce the complexity of searching a vast range of encoder mode, partition, and motion decisions. Some neural network solutions that may be employed in some embodiments are described in Liu, Zhenyu, et al. "CU partition mode decision for HEVC hardwired intra encoder using convolution neural network." *IEEE Transactions on Image Processing* 25.11 (2016): 5088-5103; and in Xu, Mai, et al. "Reducing Complexity of HEVC: A Deep Learning Approach." *IEEE Transactions on Image Processing* (2018): 5044-5059.

Neural networks may be trained to do video quality analysis, which may be useful, e.g., for monitoring encoder performance. Some solutions that may be implemented in some embodiments are described in Zhu, Kongfeng, et al., "No-reference video quality assessment based on artifact measurement and statistical analysis," *IEEE Transactions on Circuits and Systems for Video Technology* 25.4 (2015): 533-546.

Figure 9:
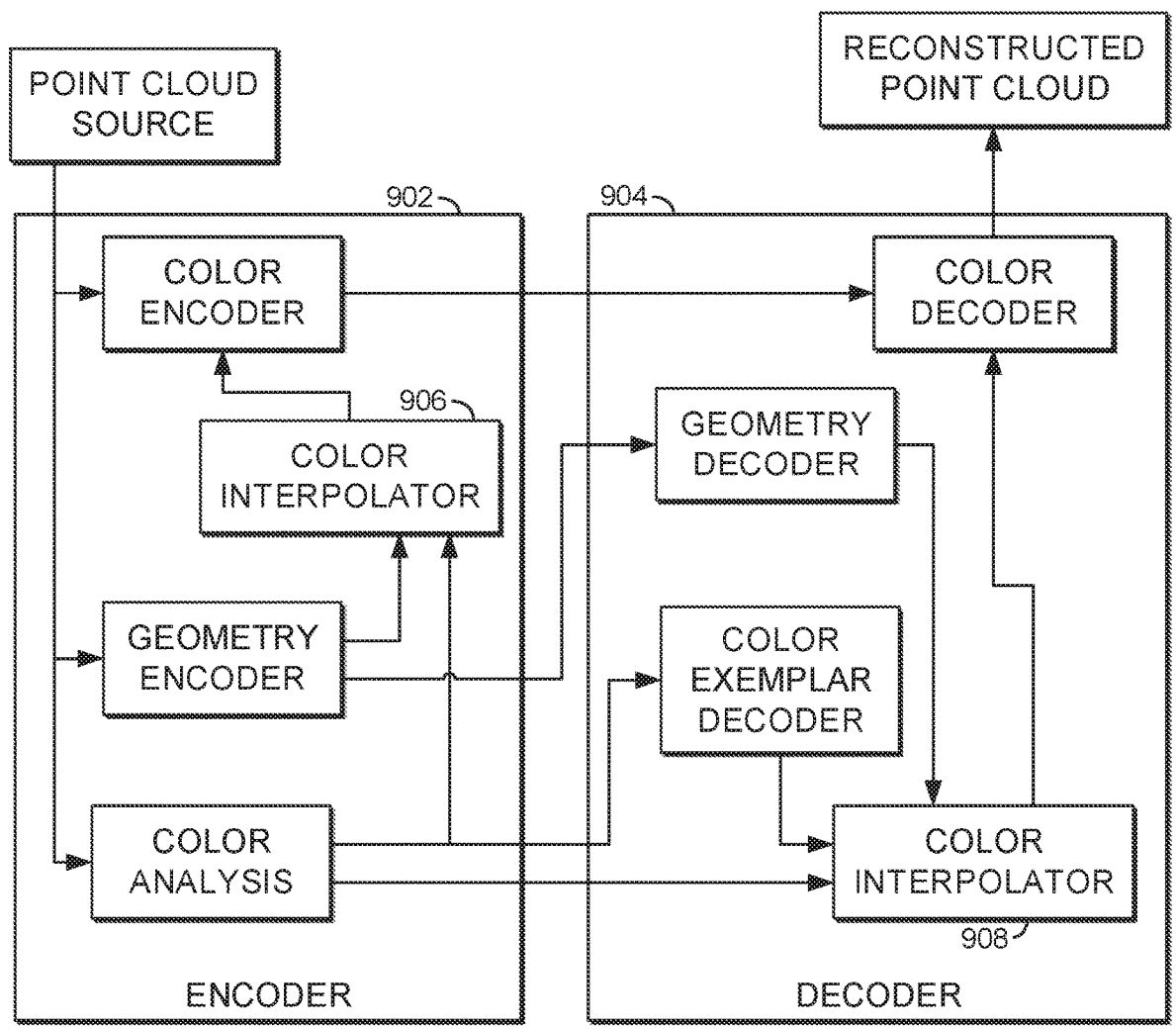
FIG. 9 is a functional block diagram of a point cloud encoder and corresponding decoder in an embodiment in which a color interpolator is used inside the encoding loop.

FIG. 9 depicts a point cloud encoder 902 and corresponding decoder 904, each of which use a respective color interpolator (906, 908) inside the encoding loop, in accordance with some embodiments. The colorization model may generate color values based on the context of a point, motion, and mode decisions. The colorized result may be used as a predicted image with an additional color residual transmitted. The colorized prediction may reduce the size of the color residual information, leading to improved compression. The color interpolator may be driven by geometry alone or by supplying a sparse set of color hints in addition to the geometry data. The colorizer model may be predefined or may be signaled via a neural network representation.

Figure 10A:
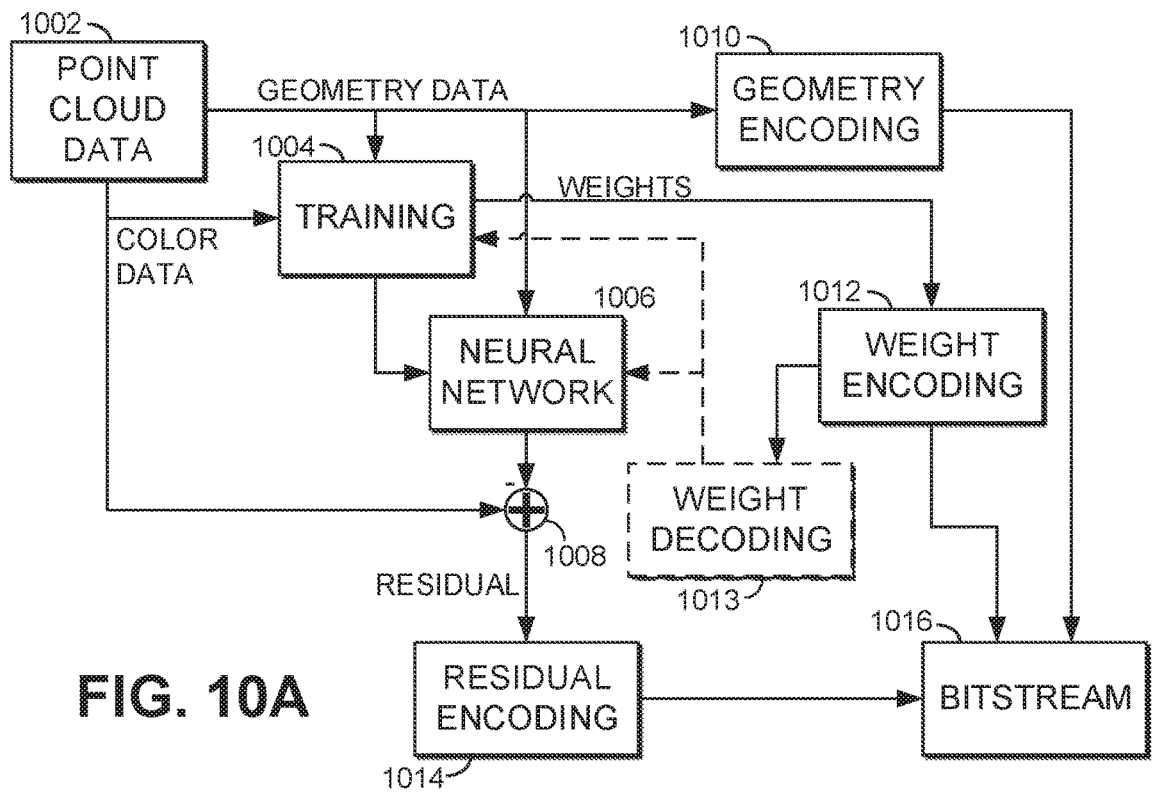
FIG. 10A is a functional block diagram illustrating a point cloud encoder according to some embodiments.

FIG. 10A illustrates an encoder that has access to raw point cloud data 1002 consisting of geometry data (e.g. x,y,z coordinates for each of a plurality of points in the point cloud) and, optionally, corresponding luma and chroma signals (or color signals in some other format). The luma and chroma signals may correspond to an scanned object or scene, or to a synthetic representation of content. The encoder may have several encoding parameters such as target bitrate, codec tools, profile, and level settings. In the example, the encoder may processes the raw point cloud data to construct a representation of the geometry of the point cloud which is devoid of luma and chroma information. The point cloud and luma/chroma information may be used in a training process at module 1004 to produce a set of weights describing the operation a neural network. The training weights may be used to configure a neural network 1006. The neural network is supplied with the geometry as input. The output of the neural network may include synthesized luma and chroma information (or color information in another format) corresponding to the point cloud. In the embodiment of FIG. 10A, a residual signal is produced at 1008 as the difference between the synthesized luma and chroma signals and the raw luma and chroma signals. The encoder writes the representation geometry, the neural network weights and the luma/chroma residual to a bitstream. The geometry of the point cloud is encoded by module 1010, the neural network weights are encoded by module 1012, and the residual is encoded by module 1014 into the bitstream In the encoder of FIG. 10A, parameters describing the neural network are communicated from an encoder to a decoder via the bitstream. Original point cloud data and original luma and chroma signals are input to the encoder. The geometry encoding module 1010 generates the bitstream representation of the encoded point cloud data geometry. This may employ an octree decomposition or other means for representing the point cloud geometry in the bitstream. The original point cloud data and original luma and chroma signals are provided as input to the neural network training module 1004. This module determines a set of parameters describing the connection of the network designed to generate luma and chroma values from the point cloud data. This network is designed based on the original point cloud signals. If the point cloud data encoder process is lossy, it may be desirable to use the result of locally decoding the point cloud data (at module 1013) as input to the training module 1004 and to the neural network 1006. The weights output by the training process are encoded and written to the bitstream. A decoded version of the weights is used as input to the neural network. In the case of lossless coding of the weights, the output of the training process may be used directly, avoiding the need for an encode and decode cycle. The neural network is configured by the weights and given an input that includes the point cloud geometry data. The neural network produces predicted luma and chroma signals. Residual signals are produced by computing the difference between the original luma and predicted luma signal and also the difference between each original chroma component and corresponding predicted chroma component. The residual signals are then encoded into the bitstream. Techniques such as spatial transform coding may be applied to the residual signal as part of the residual encoding process.

Figure 10B:
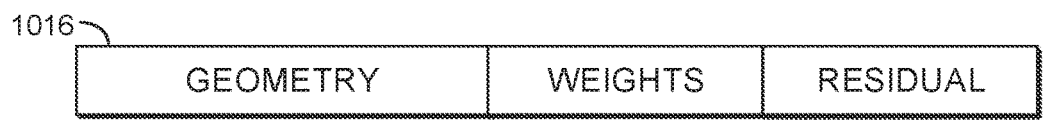
FIG. 10B is a schematic illustration of a bitstream generated using the encoder of FIG. 10A.
Figure 10C:
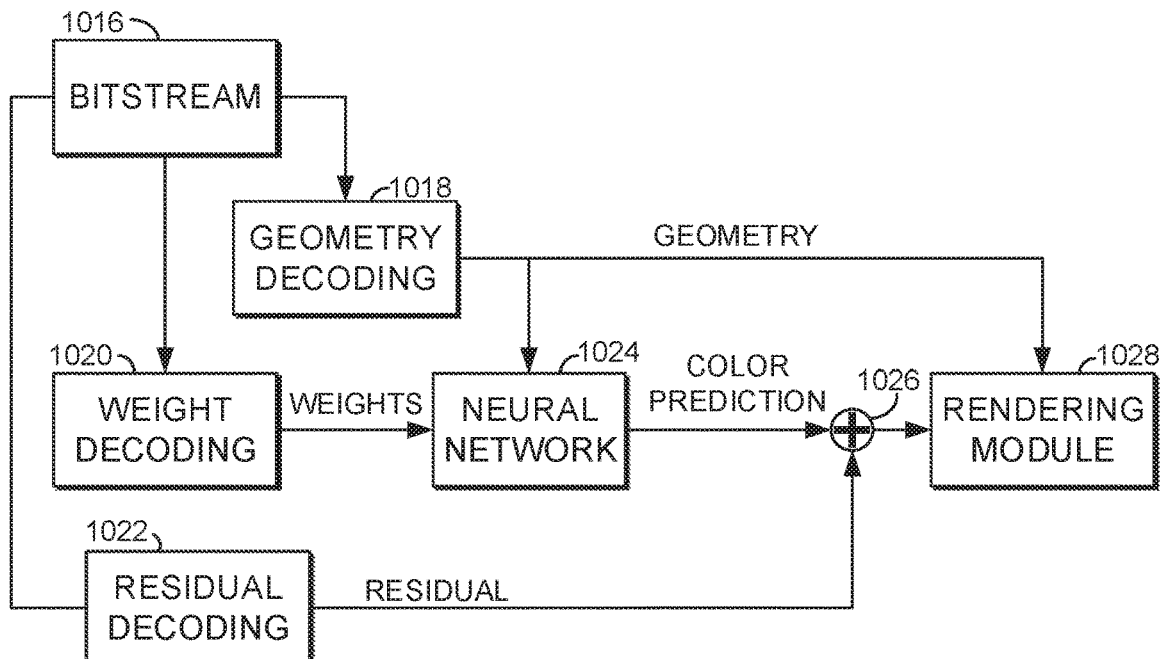
FIG. 10C is a functional block diagram illustrating a point cloud decoder corresponding to the encoder of FIG. 10A and operable to decode the bitstream of FIG. 10B.

FIG. 10B is a schematic illustration of a portion of a bitstream generated by an encoder such as that of FIG. 10A. The bitstream includes, in encoded form, geometry information, neural network weights, and color residual information, in accordance with some embodiments. The partial bitstream contents of this embodiment include encoded point cloud data which describes the geometry of the point cloud, encoded weights which characterize the neural network used to predict luma and chroma signals, and additional encoded residuals computed as a difference between the original and predicted luma & chroma signals.

FIG. 100 illustrates a decoder that receives the bitstream 1016 and extracts the geometry (at module 1018), neural network weights (at module 1020), and residual (at module 1022). The geometry is input to a neural network 1024 configured by the extracted weights. The neural network synthesizes luma and chroma signals from the geometry information. When a residual signal is present in the bitstream, the decoder may extract the residual signal and add it to the synthesized luma and chroma signals (at 1026) in order to produce reconstructed luma and chroma signals. When the residual signal is not present in the bitstream, the decoder may use the synthesized luma and chroma signals as the reconstructed luma and chroma signals. At the decoder, a rendering module 1028 receives the geometry information and the reconstructed luma and chroma signals. The renderer outputs a colored point cloud.

The decoder of FIG. 100 receives a bitstream containing encoded point cloud data, encoded weights, and encoded residuals. The encoded point cloud data is decoded to produce decoded point cloud data that characterizes the point cloud geometry. The encoded weights are decoded to produce decoded weights used to configure the neural network 1024. The encoded residual data is decoded to produce residual signals for the luma and chroma signal components. The decoded point cloud data is supplied to a 3D rendering process and supplied as input to the neural network. The neural network is configured by the decoded weights and uses the decoded point cloud data to produce predicted luma and chroma signals. The predicted luma and chroma signals are added to the corresponding luma and chroma residuals to produce reconstructed luma and chroma signals. The reconstructed luma and chroma signals are provided to a 3D rendering process, and are rendered along with the decoded point cloud data.

Figure 11A:
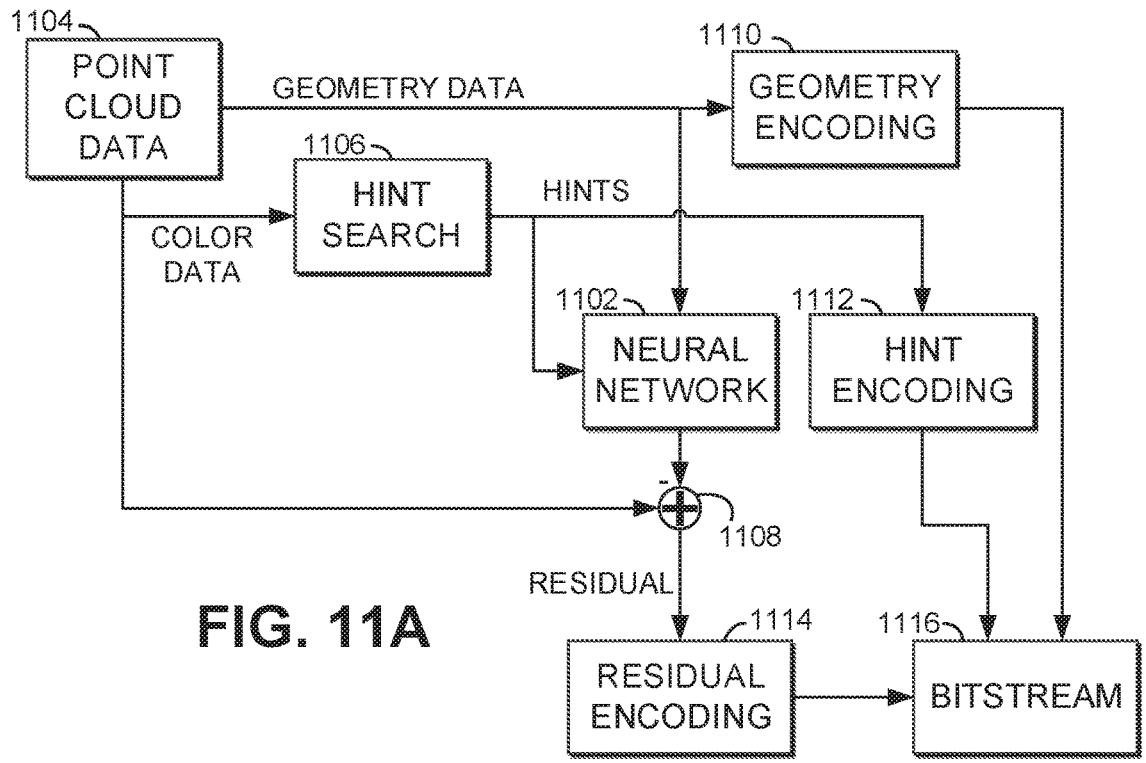
FIG. 11A is a functional block diagram illustrating a point cloud encoder according to some embodiments.
Figure 11B:
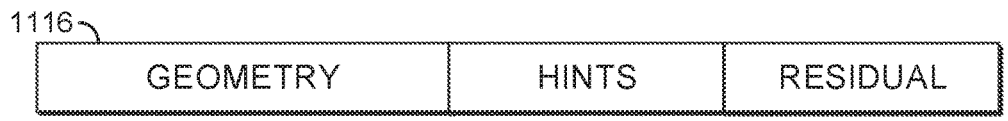
FIG. 11B is a schematic illustration of a bitstream generated using the encoder of FIG. 10A.
Figure 11C:
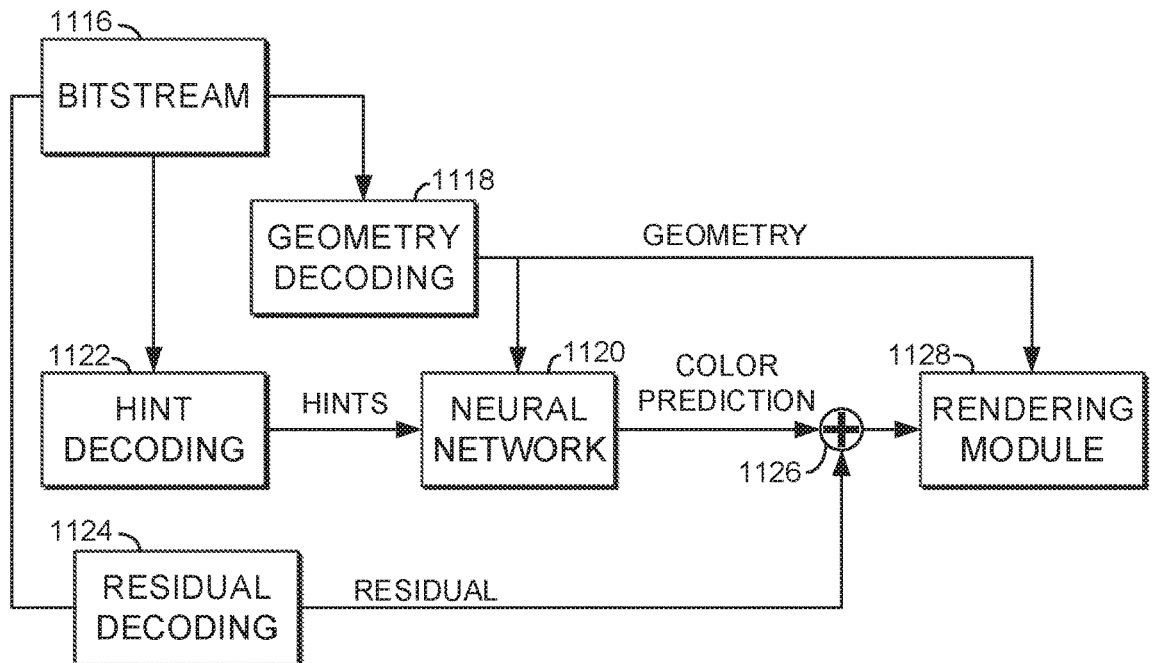
FIG. 11C is a functional block diagram illustrating a point cloud decoder corresponding to the encoder of FIG. 11A and operable to decode the bitstream of FIG. 11B.

FIGS. 11A-C illustrate a point cloud encoder, a portion of a bitstream generated by such an encoder, and a decoder operative to decode such a bitstream. The embodiments of FIGS. 11A-C make uses of a bitstream that encodes geometry, colorization hints, and color residual information. The encoder shown in FIG. 11A includes a pretrained neural network 1102 described via weights and operates to process raw point cloud data 1104 that includes geometry information and may include corresponding luma and chroma signals (or color information in another format, such as RGB). The luma and chroma signals may correspond to an scanned object or scene or to a synthetic representation of content. The encoder may have several encoding parameters such as target bitrate, codec tools, profile, and level settings.

In the example of FIG. 11A, the encoder may processes the raw point cloud data to construct a representation of the geometry of the point cloud which is devoid of luma and chroma information. A hint search process (module 1106) produces a set of colorization hints to be used by the neural network 1102 to generate luma and chroma data for the point cloud. This hint search may be based on identification of representative color feature points or via minimization of residual following the generation of the luma and chroma signals. The hints and geometry are provided to the neural network. The output of the neural network may include synthesized luma and chroma information corresponding to the point cloud. A residual signal may be produced (at module 1108) as the difference between the synthesized luma and chroma signals and the raw luma and chroma signals. The point cloud geometry is encoded at module 1110, the color hints are encoded at module 1112, and the residual is encoded at module 1114. The encoder writes the representation geometry, the hints and optional luma/chroma residual to a bitstream 1116.

The encoder of FIG. 11A performs a hint selection process to generate luma/chroma hints. This process may include subsampling the original luma/chroma signals to produce a sparse luma/chroma representation, which may then be used as input to the neural network. In some embodiments, the encoder may vary the amount of luma/chroma information provided as input to the neural network while observing the accuracy of the luma/chroma prediction produced by the neural network in order to provide enough luma/chroma hint information to produce a given level of accuracy in the prediction output. For example, the energy of the luma/chroma prediction residual may be reduced by providing luma/chroma hints or by increasing the density of the provided luma/chroma hints.

FIG. 11B depicts partial bitstream contents of the bitstream 1116, including encoded geometry information, encoded color hints, and encoded residual information. The tradeoff between bits spent on luma/chroma hints and bits used to code the residual may be analyzed and set by the encoder.

The decoder shown in FIG. 11C receives the bitstream 1116 and extracts the geometry and hints. The geometry is decoded by module 1118 and input to the predefined neural network 1120, which may be the same as the neural network 1102 used at the encoder. Color hints are decoded from the bitstream by module 1122 and are provided to the neural network. The neural network 1120 outputs luma and chroma signals based on the input of geometry and hint information. When a residual signal is present in the bitstream, the decoder may extract the residual signal at module 1124 and add it to the synthesized luma and chroma signals to produce reconstructed luma and chroma signals at module 1126. When the residual signal is not present in the bitstream, the decoder may use the synthesized luma and chroma signals as the reconstructed luma and chroma signals. At the decoder, a rendering module 1128 receives the geometry information and the reconstructed luma and chroma signals. The rendering module 1128 may output a colored point cloud.

At the decoder of FIG. 11C, the decoded point cloud data and the decoded luma/chroma hints are provided as input to the neural network, which is configured using the same neural network weights used at the encoder. The neural network at the decoder thus produces the same predicted luma/chroma signals as those that were produced at the encoder side. The decoder combines this prediction signal with the decoded luma/chroma residual signals in order to reconstruct the luma/chroma for display. The reconstructed luma/chroma signals and the decoded point cloud data are then provided to a 3D rendering process for display to a user.

In the example of FIGS. 11A-11C, the neural network weights do not need to be encoded into the bitstream. In this example, the same neural network may be used for different point clouds, with color hints being used to provide information specific to the point cloud being rendered. Training of such a general-use colorizing neural network may be performed off-line (e.g. even before encoder and decoder software or hardware is distributed for use.)

In different embodiments, the point cloud geometry data my be input to the neural network in different formats. For example, in some embodiments, a point cloud with n points may be input to the neural network as a set of nx3 values, where each value corresponds to one of the x, y, or z coordinates of the respective point. A point cloud in such a format may be processed by a neural network as described in Qi et al, "Pointnet: Deep learning on point sets for 3d classification and segmentation," IEEE Conference on Computer Vision and Pattern Recognition (CVPR), July 2017. In some embodiments, the point cloud may be converted to a volumetric representation that includes, for each of a plurality of voxels, information regarding the occupancy of the respective voxel (e.g. information indicating whether or not any point is present in the voxel). The neural network may be operative to output a respective set of color coordinates for each of the voxels. In some embodiments, the neural network may accept an input in the form of x,y,z coordinates for each point and provide an output in the form of color coordinates for respective voxels in a volumetric representation.

Solutions that may be implemented in some embodiments for using a neural network to process point cloud data include techniques such as Pointnet, (described in Qi et al., supra), Pointnet++(described in Qi et al., "Pointnet++: Deep hierarchical feature learning on point sets in a metric space," *arXiv preprint arXiv:*1706.02413, 2017), kd-Networks (described in Roman Klokov and Victor Lempitsky, "Escape from cells: Deep kd-networks for the recognition of 3d point cloud models," arXiv preprint arXiv:1704.01222, 2017), and 3D Modified Fisher Vectors (described in Ben-Shabat, Yizhak, Lindenbaum, M., and Fischer, A., "3D Point Cloud Classification and Segmentation using 3D Modified Fisher Vector Representation for Convolutional Neural Networks," *arXiv preprint arXiv:*1711.08241, 2017).

In some embodiments, a neural network for colorization of n points includes nx3 inputs and nx3 outputs, where the inputs include x,y,z coordinates of each point, and the outputs include three color components, which may be, for example, a luma component and two chroma components or three RGB components. Such a neural network may be trained on a collection of training point clouds with color information by using a back-propagation algorithm. For example, the geometry of a point cloud (e.g. the coordinates of the points) may be provided to the neural network as input, the outputs of the neural network may be compared with the color components of the points, and weights of the neural network may be updated based on the comparison. Analogous training techniques may be implemented when the point cloud is represented in a volumetric (e.g. voxel-based) representation.

In some embodiments, the training of the neural network is initially performed using a number of training point clouds to generate an initial set of neural network weights. Subsequently, to provide a neural network that characterizes the color information of a particular point cloud, that particular point cloud is provided to the neural network as training data, and the neural network weights are updated accordingly.

In some embodiments, the neural network weights are provided to the decoder in differential form, representing a difference between the weights to be used for color prediction of a current point cloud and weights used for color prediction of a previous point cloud, or a difference from a set of default weights.

In some embodiments, different sets of neural network weights may be made available for different types of point cloud data. For example, some neural networks may be more effective at predicting color data for point clouds representing vegetation, and other point clouds may be more effective at predicting color data for point clouds representing architectural features. Neural network parameters provided to a decoder may include information identifying one or more such sets of neural network weights (which the decoder may have pre-stored or may be able to retrieve over a network). Neural network parameters may further include differential information identifying variations from such predetermined sets of weights.

In some embodiments, the point cloud data may be rendered to a monochrome 2D image, and the monochrome 2D image data may be input to the neural network for colorization. In some embodiments, the point cloud data may be rendered into a 3D voxel format and the voxel data may be input to the neural network for colorization.

In some embodiments, the point cloud data may be rendered into a 2D depth projection format that is input to the neural network. Similar to the 2D perspective view, the point cloud data is represented from a viewpoint; however the pixels contain depth values. In the case of a 3D depth projection view, a light model may not be needed.

In some embodiments, the input to the neural network is a region-wise variant of any of the above methods of preparing point cloud data for input to the neural network. For example, a sub-region of the scene may be input to the neural network, and the output may comprise color information for the corresponding region. In this manner, the process may not call for the entire set of spatial data representing the scene. Instead, spatial data may be partitioned into smaller sets. In the case of partitioning the spatial data into regions, it may be useful to communicate the identity of the partitioned region between the encoder and the decoder. Regardless of the format, the input representing the point cloud data may be used with any of the compression scenarios described herein.

Local and global hints may impact the results of colorization. In some embodiments, local hints are color values (e.g. RGB or $YC_BC_R$ values, among other possibilities) for particular positions (e.g. for particular points in a point cloud or for particular voxels) in spatial data. In some embodiments, a global hint is a color histogram. In some embodiments, a global hint is an input image, which may be used to derive a color histogram. Different color hints may result in different colorization results. In some embodiments, color hints are selected in a rate-distortion optimization process so as to substantially minimize the amount of information used to send color hints and color residual data while preserving quality of the colorized output. Different numbers of local color hints may be supplied in different embodiments.

Further Embodiments

In some embodiments, a method for procedurally colorizing spatial data is performed on the content server. In such embodiments, the viewing client may send to the content server an indication of the viewpoint it uses to view the point cloud. The content server may colorize the point cloud according to the indicated viewpoint using the previously described processes for colorizing spatial data.

In some embodiments, the server can process pre-recorded spatial data as an offline process. Color values for the spatial data set may be created offline, and the colorized version may be distributed to the viewing clients based on client requests. In such embodiments, the content server may use the process for colorizing spatial data as previously described. However, instead of colorizing data based on a selected viewpoint, the process may include traversing the spatial data with varying viewpoints that cover the whole spatial data area in order to process each data point.

In some embodiments, a method is implemented for real-time use on automotive platforms. For example, a vehicle's embedded sensor system may lack an RGB sensor, or its RGB sensor may fail to produce color values, e.g., due to the prevailing environment conditions (low light, strong back light, etc.). In such scenarios, the colorization may be used for inferring color to the spatial data captured by the vehicle sensors. The colorized data may then be used, for example, to provide a visualization to the occupants of the vehicle (e.g., in order to increase their situational awareness).

In some embodiments, a method is provided for encoding a point cloud and associated color (e.g. luma and chroma) information. The method includes training a neural network using a neural network training process to produce neural network parameters (e.g. a set of weights). The neural network training process uses as input point cloud data which represents the point cloud. The neural network training process further uses as a reference output an original color signal, such as an original luma signal and an original chroma signal. The point cloud data is applied as input to a neural network defined by the set of neural network parameters to produce color prediction data (e.g. luma and chroma prediction data). A residual signal is computed that represents the difference between the luma and chroma prediction data and the original luma and chroma signals. A bitstream is generated that includes a representation of the point cloud, the neural network parameters, and the residual signal. The bitstream may be transmitted over a network to a decoder device.

In some embodiments, the representation of the point cloud is a compressed representation of the point cloud data.

In some embodiments, the bitstream additionally includes color hint data (e.g. luma and chroma hint data).

In some embodiments, the neural network parameters include weights that define the neural network used to produce the color (e.g. luma and chroma) prediction data.

In an example method for decoding and rendering a compressed representation of a point cloud with color information, client receives a bitstream comprising a representation of the point cloud, a set of neural network parameters, and a residual signal. The client recovers point cloud data from the representation of the point cloud. The point cloud data is applied as input to a neural network defined by the set of neural network parameters to produce color (e.g. luma and chroma) prediction data. The color (e.g. luma and chroma) prediction data is combined with the residual signal to produce recovered color signals. The client may then render a 3D representation of the point cloud based on the point cloud data and the recovered color signals.

In some embodiments, the representation of the point cloud is a compressed representation, and the step of recovering point cloud data includes decompressing the compressed representation.

In some embodiments, the bitstream additionally includes color hint data (e.g. luma and chroma hint data), and the color hint data are used as additional input to the neural network to produce the color (e.g. luma and chroma) prediction data.

In some embodiments, the neural network parameters include weights that characterize the neural network used to produce the color prediction data.

In some embodiments, the neural network parameters are generated by a training process at an encoder, where the input to the training process includes at least the point cloud data, an original luma signal, and an original chroma signal.

In an example method for encoding a point cloud and associated luma and chroma information, point cloud geometry data and a set of color hints are input to a neural network. The neural network is operated to determine luma and chroma prediction data. A residual signal is calculated, the residual signal representing a difference between the luma and chroma information and the determined luma and chroma prediction data. A bitstream is generated that includes a representation of the point cloud. The bitstream may further include the set of color hints and the residual signal. The bitstream may be transmitted over a network to a decoder device.

In some embodiments, the representation of the point cloud is a compressed representation of the point cloud data.

In some embodiments, the neural network is defined by a set of neural network parameters available to the encoder.

In some embodiments, the neural network parameters are not part of the generated bitstream.

In some embodiments, the neural network is defined by a set of neural network parameters produced by a neural network training process, the neural network training process involving additional point cloud data other than the point cloud data recovered from the bitstream.

In some embodiments, the neural network is defined by a set of neural network parameters produced by a neural network training process, the neural network training process not involving the point cloud data.

In an example method for decoding and rendering a compressed representation of a point cloud with color information a client receives a bitstream comprising a representation of the point cloud, a set of color hints, and a residual signal. Point cloud data is recovered from the representation of the point cloud. The point cloud data and the color hints are applied as input to a neural network to produce color (e.g. luma and chroma) prediction data. The luma and chroma prediction data are combined with the residual signal to produce recovered luma and chroma signals. A representation of the point cloud is rendered based on the point cloud data and the recovered luma and chroma signals.

In some embodiments, the representation of the point cloud is a compressed representation, and the step of recovering point cloud data comprises decompressing the compressed representation.

In some embodiments, the neural network is defined by a set of neural network parameters available to the decoder. In such embodiments, the neural network parameters are not necessarily part of the received bitstream.

In some embodiments, the neural network is defined by a set of neural network parameters produced by a neural network training process, the neural network training process involving additional point cloud data other than the point cloud data recovered from the bitstream.

In some embodiments, the neural network is defined by a set of neural network parameters produced by a neural network training process, the neural network training process not involving the point cloud data recovered from the bitstream.

In some embodiments, the neural network is defined by a set of neural network parameters received separately from the bitstream.

Some embodiments include a system comprising a processor and a non-transitory computer-readable medium storing instructions operative to perform any of the methods described herein.

In an example embodiment, a method for colorizing spatial data includes receiving a set of neural network parameters; determining a set of reference color values; determining a viewpoint of the spatial data; rendering a 2D view of the spatial data based on the determined viewpoint; applying the rendered 2D view and the set of reference color values as inputs to a neural network defined by the set of neural network parameters to produce a colorized 2D view; and generating colorized spatial data based on the spatial data and the colorized 2D view.

In some such embodiments, determining the set of reference color values includes determining a set of color values associated with a subset of data points from the spatial data.

In some embodiments, generating colorized spatial data comprises projecting color values from the colorized 2D view onto associated points of the spatial data.

In some embodiments, the method further includes: determining a second viewpoint of the spatial data; rendering a second 2D view of the spatial data based on the second viewpoint; obtaining local color hints, the local color hints comprising a set of color values associated with a subset of data points from previously generated colorized spatial data; applying the second rendered 2D view and the local color hints as inputs to the neural network to produce a second colorized 2D view; and generating colorized spatial data based on the spatial data and the second colorized 2D view.

In some embodiments, determining the set of reference color values comprises receiving a reference image. The reference image may be a user-selected image from an application.

In some embodiments, the spatial data is associated with metadata that indicates a location, and wherein receiving a reference image comprises searching a database based on the indicated location.

In some embodiments, the reference image has a global histogram and a saturation, and applying the rendered 2D view and the set of reference color values as inputs to the neural network operates to produce a colorized 2D view that reproduces a color scheme of the reference image.

In some embodiments, a method further includes: determining global color hints; determining a second viewpoint of the spatial data; rendering a second 2D view of the spatial data based on the second viewpoint; applying the second rendered 2D view and the global color hints as inputs to the neural network to produce a second colorized 2D view; and generating colorized spatial data based on the spatial data and the second colorized 2D view. The determining of global color hints may include: identifying a process duration; determining a weight based on the process duration; and generating a weighted set of reference color values by mixing color values from the reference image with color values from the colorized 2D view based on the determined weight.

In some embodiments, determining the viewpoint of the spatial data comprises tracking a location and orientation of a user device.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method comprising:
   receiving a bitstream that encodes at least (i) geometry information for a point cloud, (ii) neural network parameter data, and (iii) a residual color signal;
   producing color prediction data for the point cloud by supplying the geometry information as input to a neural network characterized by the received neural network parameter data; and
   adding the residual color signal to the color prediction data to generate a reconstructed color signal for the point cloud.

2. The method of claim 1, further comprising rendering a representation of the point cloud using the reconstructed color signal.

3. The method of claim 1, wherein the neural network parameter data comprises a set of neural network weights.

4. The method of claim 1, wherein the neural network parameter data comprises information identifying a stored set of neural network weights.

5. The method of claim 1, wherein the bitstream further encodes color hint data, and wherein producing color prediction data further comprising supplying the color hint data as input to the neural network.

6. The method of claim 1, wherein the bitstream further encodes local color hint data comprising at least one color sample of at least one respective position in the point cloud, and wherein producing color prediction data further comprises supplying the local color hint data as input to the neural network.

7. The method of claim 1, wherein the bitstream further encodes global color hint data comprising color histogram data, and wherein producing color prediction data further comprises supplying the global color hint data as input to the neural network.

8. The method of claim 1, wherein the bitstream further encodes global color hint data comprising color saturation data, and wherein producing color prediction data further comprises supplying the global color hint data as input to the neural network.

9. The method of claim 1, wherein producing color prediction data further comprises supplying a previously-reconstructed color signal of a previously-reconstructed point cloud as input into the neural network.

10. The method of claim 1, wherein the color prediction data produced for the point cloud includes luma and chroma information for each of a plurality of points in the point cloud.

11. The method of claim 1, wherein the geometry information is encoded in the bitstream in a compressed form, and wherein the method further comprises decompressing the geometry information.

12. The method of claim 1, wherein the geometry information for the point cloud comprises position information for each of a plurality of points in the point cloud.

13. An apparatus comprising:
    a processor configured to perform at least:
    receiving a bitstream that encodes at least (i) geometry information for a point cloud, (ii) neural network parameter data, and (iii) a residual color signal;
    producing color prediction data for the point cloud by supplying the geometry information as input to a neural network characterized by the received neural network parameter data; and
    adding the residual color signal to the color prediction data to generate a reconstructed color signal for the point cloud.

14. The apparatus of claim 13, wherein the neural network parameter data comprises a set of neural network weights.

15. The apparatus of claim 13, wherein the bitstream further encodes color hint data, and wherein producing color prediction data further comprising supplying the color hint data as input to the neural network.

16. The apparatus of claim 13, wherein the neural network parameter data comprises information identifying a stored set of neural network weights.

17. The apparatus of claim 13, wherein the bitstream further encodes local color hint data comprising at least one color sample of at least one respective position in the point cloud, and wherein producing color prediction data further comprises supplying the local color hint data as input to the neural network.

18. The apparatus of claim 13, wherein the bitstream further encodes global color hint data comprising color histogram data, and wherein producing color prediction data further comprises supplying the global color hint data as input to the neural network.

19. The apparatus of claim 13, wherein the bitstream further encodes global color hint data comprising color saturation data, and wherein producing color prediction data further comprises supplying the global color hint data as input to the neural network.

20. The apparatus of claim 13, wherein producing color prediction data further comprises supplying a previously-reconstructed color signal of a previously-reconstructed point cloud as input into the neural network.

* * * * *